US009215032B2

(12) United States Patent
Zhang et al.

(10) Patent No.: US 9,215,032 B2
(45) Date of Patent: Dec. 15, 2015

(54) MULTI-CHANNEL OPTICAL TRANSMITTER ASSEMBLY AND METHODS OF MAKING AND USING THE SAME

(71) Applicants: Sheng Zhong Zhang, Chatsworth, CA (US); Near Margalit, Westlake Village, CA (US); Mark Heimbuch, Chatsworth, CA (US)

(72) Inventors: Sheng Zhong Zhang, Chatsworth, CA (US); Near Margalit, Westlake Village, CA (US); Mark Heimbuch, Chatsworth, CA (US)

(73) Assignee: Source Photonics (Chengdu) Company Limited, Chengdu (CN)

( * ) Notice: Subject to any disclaimer, the term of this patent is extended or adjusted under 35 U.S.C. 154(b) by 491 days.

(21) Appl. No.: 13/820,989

(22) PCT Filed: Feb. 27, 2013

(86) PCT No.: PCT/CN2013/071928

§ 371 (c)(1),
(2) Date: Mar. 5, 2013

(87) PCT Pub. No.: WO2014/131160

PCT Pub. Date: Sep. 4, 2014

(65) Prior Publication Data

US 2015/0318951 A1 Nov. 5, 2015

(51) Int. Cl.

| | |
|---|---|
| ***H04B 10/50*** | (2013.01) |
| ***H04B 10/40*** | (2013.01) |
| ***H04J 14/06*** | (2006.01) |

(Continued)

(52) U.S. Cl.

CPC ............... *H04J 14/06* (2013.01); *G02B 5/3083* (2013.01); *G02B 27/141* (2013.01); *G02B 27/28* (2013.01); *G02B 27/283* (2013.01); *G02F 1/093* (2013.01); *H04B 10/40* (2013.01); *H04B 10/503* (2013.01); *H04J 14/02* (2013.01)

(58) Field of Classification Search

None

See application file for complete search history.

(56) References Cited

U.S. PATENT DOCUMENTS 6,624,939 B2 9/2003 Gu
2002/0041574 A1* 4/2002 Du .................... G02B 6/12019 370/300

(Continued)

FOREIGN PATENT DOCUMENTS

CN 2716861 8/2005
CN 1683951 10/2005

OTHER PUBLICATIONS

International Search Report dated Dec. 5, 2013 (4 pgs.).

(Continued)

*Primary Examiner* — Darren E Wolf

(74) *Attorney, Agent, or Firm* — Andrew D. Fortney; Central California IP Group, P.C.

(57) ABSTRACT

An optical multiplexer and methods of making and using the same are disclosed. The multiplexer generally includes a beam splitter and a polarization beam splitter. The beam splitter is generally configured to combine first and second polarized optical signals by reflecting a first polarized optical signal towards a first target and allowing a second polarized optical signal to pass through towards the first target. The polarization beam splitter is generally configured to combine the first and second polarized optical signals with a third polarized optical signal by either (i) reflecting the third polarized optical signal towards a second target and allowing the first and second polarized optical signals to pass through towards the second target, or (ii) reflecting the first and second polarized optical signals towards the second target and allowing the third polarized optical signal to pass through towards the second target.

33 Claims, 12 Drawing Sheets

(51) Int. Cl.

| | |
|---|---|
| ***G02B 27/28*** | (2006.01) |
| ***G02B 5/30*** | (2006.01) |
| ***G02B 27/14*** | (2006.01) |
| ***G02F 1/09*** | (2006.01) |
| ***H04J 14/02*** | (2006.01) |

(56) References Cited

U.S. PATENT DOCUMENTS

2010/0079863 A1* 4/2010 Thiel ...................... B82Y 20/00 359/487.01
2012/0087678 A1* 4/2012 Earnshaw ................ G02B 6/43 398/202
2012/0189306 A1* 7/2012 Du ...................... G02B 6/4215 398/65

OTHER PUBLICATIONS

Abstract of CN2716861(Y); "Multi Laser Beam Multiplexer"; Chen Bin; Application No. CN2004244789U; Application Date Apr. 16, 2004; Espacenet.

Abstract of CN1683951(A); "Multiple Laser Beam Recombiner"; Chen Bin; Application No. CN2004126865; Application Date Apr. 16, 2004; Espacenet.

* cited by examiner (PRIOR ART)

MULTI-CHANNEL OPTICAL TRANSMITTER ASSEMBLY AND METHODS OF MAKING AND USING THE SAME

FIELD OF THE INVENTION

The present invention generally relates to the field of light-transmitting devices or optical signal transmitters. More specifically, embodiments of the present invention pertain to multi-channel optical transmitter assemblies having a reduced size high coupling efficiency, and methods of making and using the same.

DISCUSSION OF THE BACKGROUND

Optical transmitters are devices that send optical signals over optical signal transmission media in optical and opto-electronic networks. Typically, an optical transmitter is included with optical receiver in an optical transceiver. Recently, multi-channel optical transceivers have been made to communicate multiple signals over a single medium.

Multiple wavelength division multiplexing (WDM) has been used for optical interfaces for data rates at 40 Gbps (e.g., 40 GBASE LR4 and ER4) and 100 Gbps (e.g., 100 GBASE LR4 and ER4). The IEEE 802.3ba-2010 standard defines four WDM channels multiplexed onto a single fiber for these interfaces. The 40 GBASE-LR4/ER4 interface defines CWDM grids with center wavelengths of 1271, 1291, 1311, and 1331 nm. The 100GBASE-LR4/ER4 interface defines LAN-WDM channels with center wavelengths of 1295.56, 1300.05, 1304.58, and 1309.14 nm.

FIG. 1 shows a transmitter/receiver path in a conventional 40GBASE-LR4/ER4 or 100GBASE-LR4/ER4 communication system 10. The 40GBASE-LR4/ER4 or 100GBASE-LR4/ER4 communication system 10 includes a four-channel communication path. Generally, optical transceivers are at both ends of the path in the system 10, but for purposes of explaining signal transmission along the path, optical transmitters 32-38 are shown at one end of the path and optical receivers 72-78 are shown at the other end of the path. In the optical communication system 10, four separate electrical signals $L_0$ through $L_3$ are received by a retimer (e.g., buffer) 20, where the signals are synchronized and sent to respective optical transmitters 32-38 as parallel signals TP1<0:3> through a first PMD service interface 25. The optical transmitters 32-38 convert the electrical signals TP1<0:3> to optical signals on four channels that are combined by wavelength division multiplexer 40 and transmitted over a patch cord 45 through a MDI 42.

The combined optical signals are transmitted over optical fiber/cable, through a second MDI 52, where the optical signals are demultiplexed (i.e., separated) by wavelength division demultiplexer 60 into the separate optical signals for processing by the optical receivers 72-78. The optical receivers 72-78 convert the separate optical signals on each channel into separate electrical signals TP4<0:3> through a second PMD service interface 75. At the same time, AND gate 80 detects the presence of a signal on any of the channels at optical receivers 72-78 to inform external devices (e.g., in the network) that a signal has been received. The electrical signals TP4<0.3> are received by retimer 90, synchronized, and transmitted to various receiving devices elsewhere in the network.

For various reasons, it is important, if not critical, to fabricate compact, low cost optical subassemblies (OSAs) for use in such transceivers. Thus, there is demand for ever-smaller optical devices, particularly in multi-channel optical transmitters and transceivers.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present application concerns novel transmitter optical subassembly (TOSA) designs, and particularly multiplexers therefor, using free space optics. Embodiments of the present invention therefore relate to multiplexers for multi-channel optical transmitters having a relatively small size and relatively high coupling efficiency, optical transceivers including the same, optical and/or optoelectronic networks including such optical transceivers, and methods of making and/or using the optical transmitters.

In one aspect of the invention, an optical multiplexer may comprise a first beam splitter and a polarization beam splitter. The beam splitter is configured to combine first and second polarized optical signals by reflecting a first polarized optical signal towards a first target and allowing a second polarized optical signal to pass through towards the first target. The polarization beam splitter is configured to combine the first and second polarized optical signals with a third polarized optical signal by either (i) reflecting the third polarized optical signal towards a second target and allowing the first and second polarized optical signals to pass through towards the second target, or (ii) reflecting the first and second polarized optical signals towards the second target and allowing the third polarized optical signal to pass through towards the second target. The first and second targets are the same or different. Each of the first, second and third polarized optical signals has a unique center wavelength corresponding to a channel of a multichannel optical communication system or network. In general, the center wavelength of each of the polarized optical signals differs from the other center wavelengths by about 4.5 nm or more. The beam splitter(s) may comprise a wavelength-selective filter or a dichroic mirror.

In one embodiment, the polarization beam splitter reflects the third polarized optical signal and allows the first and second polarized optical signals to pass through, and the faces of the first beam splitter and the polarization beam splitter are orthogonal to each other. In another embodiment, the polarization beam splitter reflects the first and second polarized optical signals towards the second target and allows the third polarized optical signal to pass through, and the faces of the first beam splitter and the polarization beam splitter are parallel to each other. The first beam splitter may be oriented at an angle of 45° relative to the first and second polarized optical signals, and the polarization beam splitter may be oriented at an angle of 45° relative to the third polarized optical signal.

In some embodiments, all of the polarized optical signals have the same polarization type (e.g., s-polarization or p-polarization). Alternatively, the first and second polarized optical signals may have a first polarization type, and the third polarized optical signal may have a second polarization type.

The optical multiplexer may further comprise a second beam splitter configured to combine the third polarized optical signal with a fourth polarized optical signal by either (i) reflecting the third polarized optical signal towards the polarization beam splitter and allowing the fourth polarized optical signal to pass through towards the polarization beam splitter, or (ii) reflecting the fourth polarized optical signal towards the polarization beam splitter and allowing the third polarized optical signal to pass through towards the polarization beam splitter. In some four-channel embodiments, the first and second polarized optical signals have a first polarization type, and the third and fourth polarized optical signals have a second polarization type. In other embodiments, all of the polarized optical signals have the same polarization type.

The present optical multiplexer may further comprise a half wave plate configured to rotate the first and second polarized optical signals by a predetermined angle or amount prior to impinging on the polarization beam splitter. The optical multiplexer may further comprise a second half wave plate configured to rotate the third polarized optical signal by a second predetermined angle or amount prior to impinging on the first polarization beam splitter, the second predetermined angle or amount having an opposite polarity from the first predetermined angle or amount. In some embodiments, the optical multiplexer may further comprise first and second isolators, respectively in series with the first and second half wave plates, the first and second isolators respectively configured to rotate the first and second polarized optical signals by a third predetermined angle or amount and the third polarized optical signal by a fourth predetermined angle or amount.

Alternatively or additionally, the present optical multiplexer may further comprise a first mirror configured to reflect one of the first and second polarized optical signals towards the first beam splitter, and optionally, a second mirror configured to reflect the third polarized optical signal towards the polarization beam splitter. In embodiments comprising one or more mirrors, each of the polarized optical signals may be parallel to each other before any of the first, second and third polarized optical signals impinge upon the first beam splitter, the first mirror or the second mirror. In some four-channel optical multiplexers including first and second mirrors, the second mirror reflects each of the first and fourth polarized optical signals. Alternatively, the optical multiplexer may further comprise a third mirror configured to reflect the fourth polarized optical signal.

In another aspect, the present invention relates to a transmitter optical subassembly (TOSA), comprising the present optical multiplexer, first, second and third lasers configured to emit the first, second and third polarized optical signals, respectively, and a housing configured to surround and physically protect the first beam splitter, the polarization beam splitter, and the lasers.

In a still further aspect, the present invention relates to an optical transmitter, comprising first, second, third and fourth lasers, one or more first mirrors, one or more second mirrors, and first, second and third beam splitters. The first, second, third and fourth lasers respectively output first, second, third and fourth optical signals in parallel. Each of the first, second, third and fourth optical signals has a unique center wavelength corresponding to a channel of a multichannel optical communication system or network. The reflected first optical signal crosses the second optical signal, and at least one other optical signal (e.g., the second or fourth optical signal) crosses over another of the optical signals (e.g., the third optical signal). The first mirror(s) reflect at least the first optical signal towards a first target on the first beam splitter. The first beam splitter is configured to combine the first and third optical signals by reflecting the first optical signal towards a second target (e.g., on the second mirror) and allowing the third optical signal to pass through towards the second target. The second beam splitter is configured to combine the second and fourth optical signals by reflecting one of the second and fourth optical signals towards a third target (e.g., on the second mirror or the third beam splitter) and allowing the other of the second and fourth optical signals to pass through towards the third target. The second mirror(s) reflect at least one of the combined optical signals (e.g., the combined first and third optical signals or the combined second and fourth optical signals) towards the third target. The third beam splitter is configured to combine the combined first and third optical signals with the combined second and fourth optical signals by either (i) reflecting the combined first and third optical signals towards a fourth target (e.g., a lens or a port at an input to the optical signal transmission medium) and allowing the combined second and fourth optical signals to pass through towards the fourth target, or (ii) reflecting the second and fourth optical signals towards the fourth target and allowing the combined first and third optical signals to pass through towards the fourth target.

In some embodiments, the first mirror is a single mirror that also reflects the second or fourth optical signal towards a fifth target on the second beam splitter. In such embodiments, the second or fourth optical signal crosses the third optical signal. In other embodiments, the first mirror(s) comprise separate mirrors configured to separately reflect the first and second optical signals. In some alternative or additional embodiments, the second mirror is a single mirror that reflects (i) the combined first and third optical signals towards the third target and (ii) the fourth optical signal towards the second beam splitter (e.g., the fifth target). In further alternative or additional embodiments, the second mirror(s) comprise separate mirrors configured to separately reflect (i) the combined first and third optical signals and (ii) the fourth optical signal. Alternatively, the second mirror may comprise a single mirror configured to reflect both the combined first and third optical signals and the fourth optical signal.

In a still further aspect, the present invention relates to a method of making a TOSA, comprising placing, securing, affixing, adhering, mounting or attaching a first beam splitter in or to a first location in an optical or optoelectronic device housing. and placing, securing, affixing, adhering, mounting or attaching a polarization beam splitter in or to a second location in the optical or optoelectronic device housing. The first beam splitter is configured to combine first and second polarized optical signals by reflecting a first polarized optical signal towards a first target and allowing a second polarized optical signal to pass through towards the first target. The polarization beam splitter is configured to combine the first and second polarized optical signals with a third polarized optical signal by either (i) reflecting the third polarized optical signal towards a second target and allowing the first and second polarized optical signals to pass through towards the second target, or (ii) reflecting the first and second polarized optical signals towards the second target and allowing the third polarized optical signal to pass through towards the second target. Each of the first, second and third polarized optical signals has a unique center wavelength corresponding to a channel of a multichannel optical communication system or network, and the first and second targets are the same or different. In some embodiments, the method further comprises placing, securing, affixing, adhering, mounting or attaching a second beam splitter in or to a third location in the optical or optoelectronic device housing, the second beam splitter being configured to combine the third polarized optical signal with a fourth polarized optical signal by either (i)

reflecting the third polarized optical signal towards the polarization beam splitter and allowing the fourth polarized optical signal to pass through towards the polarization beam splitter, or (ii) reflecting the fourth polarized optical signal towards the polarization beam splitter and allowing the third polarized optical signal to pass through towards the polarization beam splitter.

Yet another aspect of the present invention relates to a method of combining a plurality of polarized optical signals, comprising combining first and second polarized optical signals by reflecting a first polarized optical signal towards a first target and allowing a second polarized optical signal to pass through towards the first target, and combining the first and second polarized optical signals with a third polarized optical signal by either (i) reflecting the third polarized optical signal towards a second target and allowing the first and second polarized optical signals to pass through towards the second target, or (ii) reflecting the first and second polarized optical signals towards the second target and allowing the third polarized optical signal to pass through towards the second target. Each of the polarized optical signals has a unique center wavelength corresponding to a channel of a multichannel optical communication system or network, and the first and second targets are the same or different. In the method of combining signals, a first beam splitter combines the first and second polarized optical signals, and a polarization beam splitter combines the third polarized optical signal with the first and second polarized optical signals. In some embodiments, the method further comprises combining a fourth polarized optical signal with the third polarized optical signal by either (i) reflecting the third polarized optical signal towards the polarization beam splitter and allowing the fourth polarized optical signal to pass through towards the polarization beam splitter, or (ii) reflecting the fourth polarized optical signal towards the polarization beam splitter and allowing the third polarized optical signal to pass through towards the polarization beam splitter.

Such optical multiplexers. transmitters, transceivers, systems and methods advantageously provide a relatively small multi-channel optical signal generating device with a high coupling efficiency in a transmitter optical sub-assembly (TOSA). These and other advantages of the present invention will become readily apparent from the detailed description of various embodiments below.

DETAILED DESCRIPTION

Figure 1:
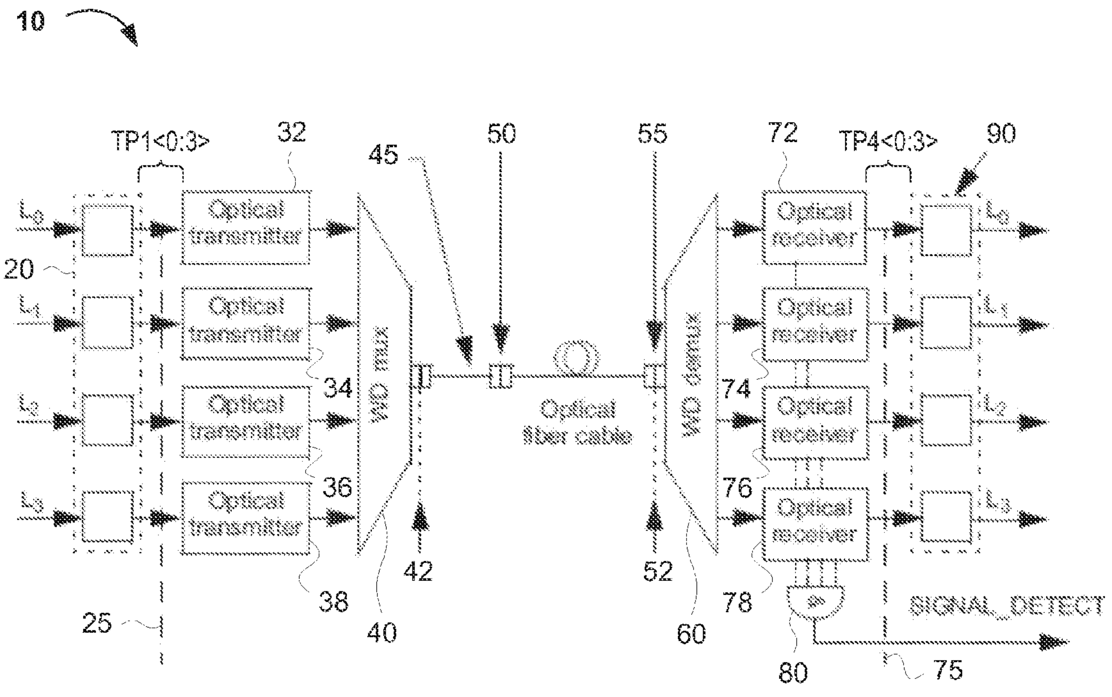
FIG. 1 shows a conventional 40GBASE-LR4/ER4 or 100GBASE-LR4/ER4 communication system, including an optical transmitter-receiver pair in a communication path.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the disclosure.

Unless specifically stated otherwise, or as will be apparent from the following discussions, it is appreciated that throughout the present application, discussions utilizing terms such as "processing," "operating," "calculating," "determining," or the like, refer to the action and processes of a computer, data processing system, or similar processing device (e.g., an electrical, optical, or quantum computing or processing device or circuit) that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data or information similarly represented as physical quantities within other components of the same or a different system or architecture.

Furthermore, in the context of this application, the terms "signal" and "optical signal" refer to any known structure, construction, arrangement, technique, method and/or process for physically transferring a signal or optical signal, respectively, from one point to another. Also, unless indicated otherwise from the context of its use herein, the terms "designated," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

For the sake of convenience and simplicity, the terms "laser," "EML," "light source," and "laser diode" are generally used interchangeably herein, and use of one such term generally includes the others, but these terms are generally given their art-recognized meanings herein. Also, the terms "optical" and "optoelectronic" are generally used interchangeably herein, and use of either of these terms also includes the other, unless the context clearly indicates otherwise. Furthermore, the terms "placing," "securing," "affixing," "adhering," "mounting" and "attaching" are generally used interchangeably herein, and use of one such term generally includes the others, but these terms are generally given their art-recognized meanings. Additionally, the term "transceiver" refers to a device having at least one receiver and at least one transmitter, and use of the term "transceiver" also includes the individual terms "receiver" and/or "transmitter," unless the context clearly indicates otherwise. Also, for convenience and simplicity, the terms "connected to," "coupled with," "communicating with," and "coupled to" (which terms also refer to direct and/or indirect relationships between the connected, coupled and/or communicating elements unless the context of the term's use unambiguously indicates otherwise). Such terms may be used interchangeably, but these terms are also generally given their art-recognized meanings.

Various embodiments and/or examples disclosed herein may be combined with other embodiments and/or examples, as long as such a combination is not explicitly disclosed herein as being unfavorable, undesirable or disadvantageous. The invention, in its various aspects, will be explained in greater detail below with regard to exemplary embodiments.

A First Exemplary Multiplexer for a Multi-Channel Optical Transmitter

FIGS. 2A-E show exemplary multiplexers 100A, 100B, 100C, 100D and 100E, respectively, for a multi-channel optical transmitter. The exemplary multiplexers 100A-100E are configured to combine three optical signals (e.g., corresponding to a three-channel apparatus), although any number of channels of at least three are possible in accordance with the present invention.

Figure 2A:
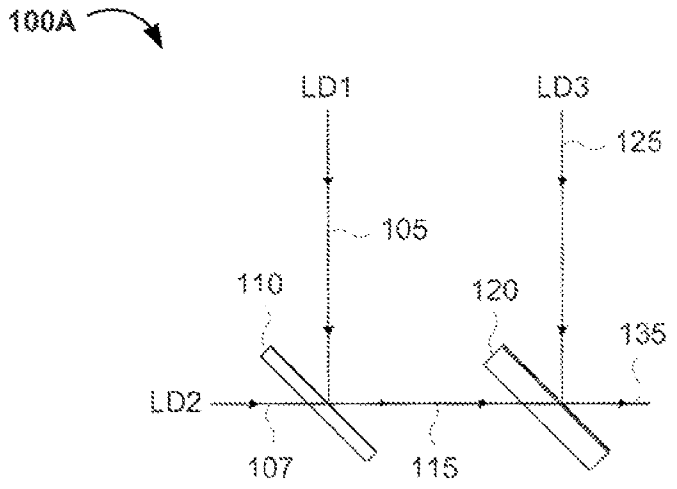
FIGS. 2A-E are diagrams of exemplary embodiments of a first free space optical signal multiplexer in accordance with the present invention.

FIG. 2A shows an exemplary multi-channel multiplexer 100A, comprising three channels. The three channels are defined by the center wavelength of light emitted by first, second and third laser diodes LD1, LD2 and LD3, although any source of polarized light pulses may be used (e.g., a pulsed edge- or surface-emitting laser diode, a distributed feedback laser [DFB], an electro-modulated laser [EML], etc.). The light emitted by the laser diodes LD1, LD2 and LD3 is polarized, but not necessarily with the same polarization type. The center wavelengths of light emitted by the laser diodes LD1, LD2 and LD3 may be from 400 nm to 3000 nm, and may have a minimum difference of about 0.4 nm, 0.8 nm, 4.5 nm, 10 nm, 20 nm, or any other value of at least about 0.4 nm (and up to about 100 nm) from the other center wavelengths of light emitted by the other laser diodes. Thus, the present multi-channel multiplexer may be useful in wave division multiplexing (WDM), coarse WDM (CWDM), and dense WDM (DWDM) applications.

As shown in FIG. 2A, first and second light beams 105 and 107, respectively. are combined by beam splitter (e.g., filter) 110. For example, first and second light beams 105 and 107 may be pulsed at a rate of from 1 kHz to 25 GHz, or any value or range of values therein. The beam splitter or filter 110 may be a wavelength-selective filter (e.g., a light filter that selectively allows light of a certain wavelength or wavelength range to pass through or to be reflected, while other wavelengths are reflected or passed through, respectively, or absorbed or scattered, as the case may be). For example, filter 110 may comprise an edge filter or a dichroic mirror that reflects light having a relatively long wavelength, while passing through light having a relatively short wavelength. Alternatively, filter 110 may reflect light having a relatively short wavelength, while passing through light having a relatively long wavelength. Filter 110 can also comprise a beam splitter such as a 50/50 beam splitter, although there may be some incremental insertion loss when using a 50/50 beam splitter.

In the example shown in FIG. 2A, first light beam 105 from first laser diode LD1 is reflected by filter 110. whereas second light beam 107 from second laser diode LD2 passes through filter 110. Thus, filter 110 may be substantially or completely transparent to the center wavelength of light 107 from the second laser diode LD2, but may reflect substantially all of the light 105 from the first laser diode LD1 at or near (e.g., within 2 nm, 5 nm, 10 nm, 20 nm, etc.) of its center wavelength. Filter 110 is positioned and the first and second light beams 105 and 107 are aligned such that the first light beam 105 is aligned with a target location on the surface of the filter 110 facing the polarization beam splitter 120 where the second light beam 107 emerges after passing through the filter 110, and the first light beam 105 is reflected along the same path that the second light beam 107 travels towards the polarization beam splitter 120, thereby combining the first and second light beams to form a composite (e.g., two-channel) optical signal 115. The polarization beam splitter 120 may also be known as a polarization beam combiner.

Similarly, third light beam 125 from third laser diode LD3 is reflected by polarization beam splitter 120, whereas the composite optical signal 115 from filter 110 passes through polarization beam splitter 120. Thus, the polarization beam splitter 120 may be substantially or completely transparent to the polarization type and/or center wavelengths of light in the composite optical signal 115, but may reflect substantially all of the light 125 from the third laser diode LD3 having its polarization type. or that is at or near (e.g., within 2 nm, 5 mm, 10 nm, 20 nm, etc.) of its center wavelength Polarization beam splitter 120 is positioned and the third light beam 125 is aligned such that the third light beam 125 is aligned with a target location on the surface of the polarization beam splitter 120 facing away from the filter 110 where the composite optical signal 115 emerges after passing through the polarization beam splitter 120, and the third light beam 125 is reflected along the same path that the composite signal 115 travels towards a second target (e.g., a waveguide, or a filter and/or lens for an output port of an optical transmitter; not shown in FIG. 2A), thereby combining the first, second and third light beams to form a multichannel optical signal 135.

The first, second and third light beams 105, 107 and 125 are each polarized. The first and second light beams 105 and 107 may have a first polarization type (e.g., s-polarization or p-polarization), and the third light beam 125 may have a second polarization type (e.g., the remaining/other one of s-polarization and p-polarization). For example, the first and second light beams 105 and 107 may be p-polarized, and the third light beam 125 may be s-polarized. Thus, each of the first, second and third laser diodes LD1, LD2 and LD3 may further include an appropriate polarizer at a location where the light is emitted from the laser diode.

Figure 2B:
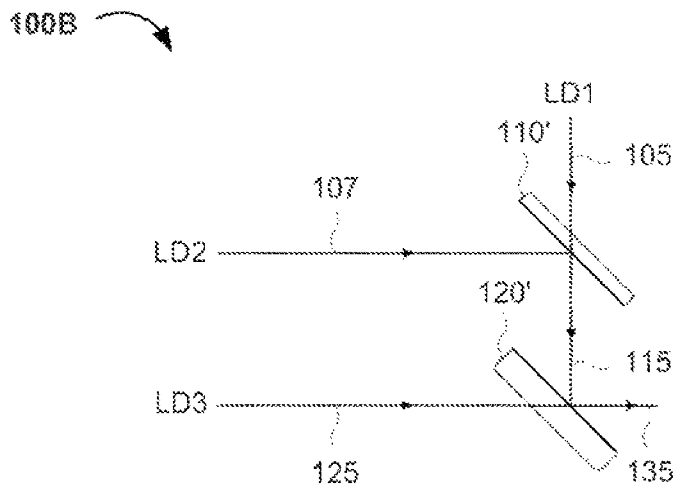

FIG. 2B shows a complementary three-channel optical multiplexer 1001, in which the filter 110' is substantially transparent to light 105 of the center wavelength emitted by first laser diode LD1 and reflective towards light 107 of the center wavelength emitted by second laser diode LD2. However, the first and second light beams 105 and 107 are combined in the same way as in FIG. 2A to form composite optical signal 115. The composite optical signal 115 is reflected by polarization beam splitter 120', but polarization beam splitter 120' is substantially transparent to light beam 125 from the third laser LD3. In such a case, the first and second light beams 105 and 107 may have a first polarization type (e.g., s-polarization), and the third light beam 125 may have a second polarization type (e.g., p-polarization).

Figure 2C:
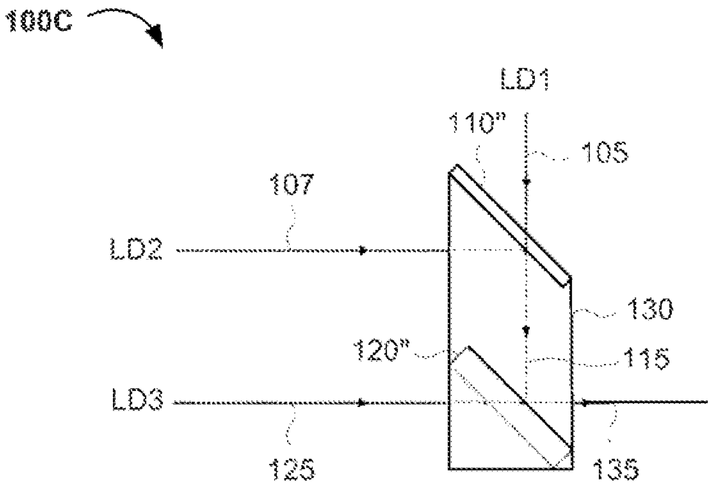

FIG. 2C shows another three-channel optical multiplexer 100C, in which the filter 110" and polarization beam splitter 120" are combined into a single unit 130. The optical multiplexer 100C of FIG. 2C functions in substantially the same way as optical multiplexer 100B in FIG. 2B, but the single unit 130 comprising filter 110" and polarization beam splitter 120" may make manufacturing of the optical multiplexer 100C relatively simple. In general, the filter 110" and polarization beam splitter 120" may be aligned at the time of or before formation of the single unit 130.

Figure 2D:
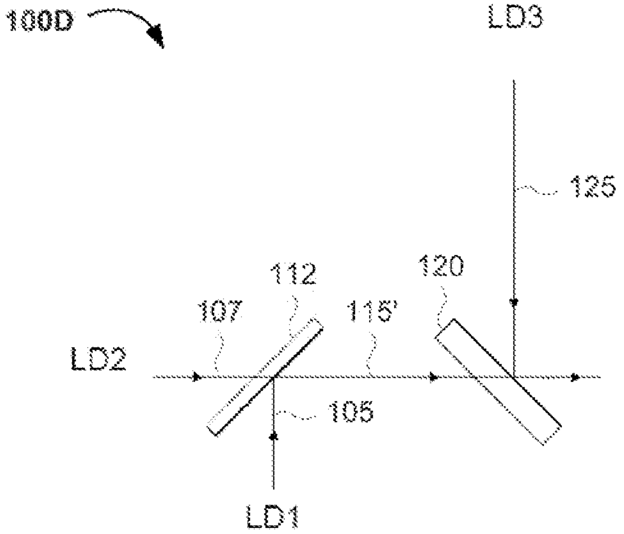

FIG. 2D shows yet another three-channel optical multiplexer 100D, in which a filter 112 has a face that is orthogonal to the face of polarization beam splitter 120. Filter 112 is substantially reflective to light 105 of the center wavelength emitted by first laser diode LD1 and substantially transparent towards light 107 of the center wavelength emitted by second laser diode LD2. However, the first and second light beams 105 and 107 are combined in substantially the same way as in FIG. 2A to form composite optical signal 115'. The composite optical signal 115' passes through polarization beam splitter 120', but polarization beam splitter 120' reflects light beam 125 from the third laser LD3. In such a case, the first and second light beams 105 and 107 may have a first polarization type (e.g., p-polarization), and the third light beam 125 may have a second polarization type (e.g., s-polarization).

Figure 2E:
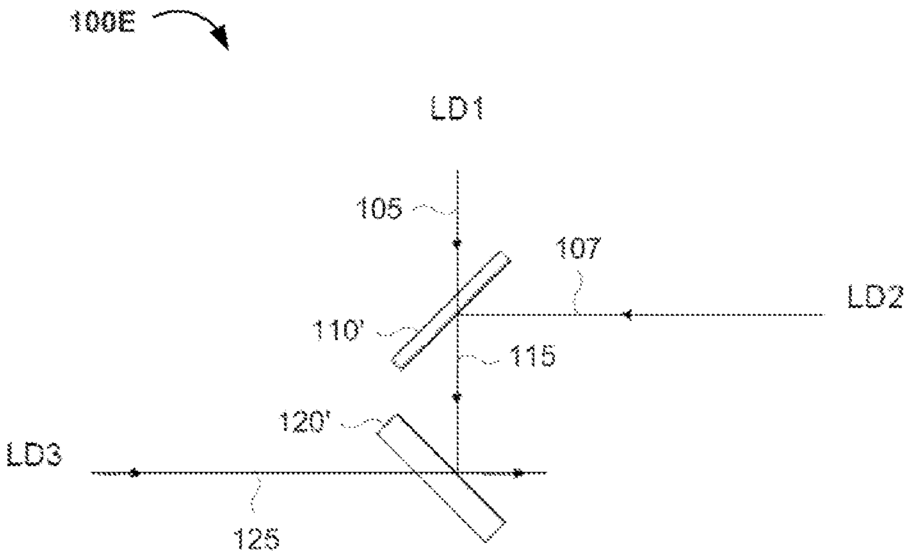

FIG. 2E shows a further three-channel optical multiplexer 100E, in which the filter 110' has a face that is orthogonal to the face of polarization beam splitter 120'. Filter 110' is substantially transparent to light 105 of the center wavelength emitted by first laser diode LD1 and reflective towards light 107 of the center wavelength emitted by second laser diode LD2, like filter 110' in FIG. 2B Thus, the first and second light beams 105 and 107 are combined in the same way as in FIG. 2B to form composite optical signal 115. However, the second and third lasers LD2 and LD3 are on opposite sides of the optical multiplexer 100E. The polarization beam splitter 120' reflects composite optical signal 115, but is substantially transparent to light beam 125 from the third laser LD3. In such a case, the first and second light beams 105 and 107 may have a first polarization type (e.g., s-polarization), and the third light beam 125 may have a second polarization type (e.g., p-polarization).

A Second Exemplary Multiplexer for a Multi-Channel Optical Transmitter

Figure 3:
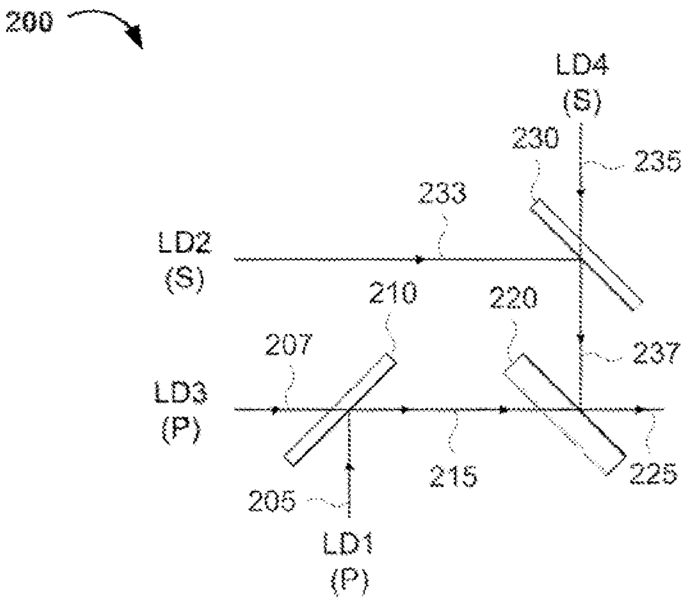
FIG. 3 is a diagram of a second exemplary free space optical signal multiplexer in accordance with embodiments of the present invention.

FIG. 3 shows an exemplary multiplexer 200 for a multi-channel optical transmitter. The exemplary multiplexer 200 is configured to combine four optical signals (e.g., polarized light emitted by first, second, third and fourth laser diodes LD1, LD2, LD3 and LD4, corresponding to a four-channel apparatus), although more or less channels may be multiplexed in accordance with the present invention The exemplary multi-channel multiplexer 200 of FIG. 3 comprises first filter 210, polarization beam splitter 220, and second filter 230. The filters 210 and 230 are functionally the same as or similar to filters 110 and 110' in FIGS. 2A-B, and polarization beam splitter 220 is functionally the same as or similar to polarization beam splitter 120 in FIGS. 2A-B. The overall function and operation of multi-channel multiplexer 200 is similar to multi-channel multiplexers 100 and 100' in FIGS. 2A-B, but a fourth optical signal is combined in the exemplary multi-channel multiplexer 200 of FIG. 3. Furthermore, the polarization beam splitter 220 and the second filter 230 can be combined to form a single, pro-assembled unit similar to unit 130 in FIG. 2C.

In the example shown in FIG. 3, a first light beam or optical signal 205 from first laser diode LD1 is reflected by filter 210 at the location where a third light beam or optical signal 207 from third laser diode LD3 emerges after passing through first filter 210, at an angle such that the reflected first light beam is aligned with and reflected along the same path that the third light beam or optical signal 207 travels towards the polarization beam splitter 220, thereby combining the first and third light beams/optical signals 205 and 207 to form a first composite (e.g., two-channel) optical signal 215. Similarly, a second light beam or optical signal 233 from second laser diode LD2 is reflected by the second filter 230 at the location where a fourth light beam or optical signal 235 from fourth laser diode LD4 emerges after passing through the second filter 230, at an angle such that the reflected second light beam or optical signal is aligned with and reflected along the same path that the fourth light beam or optical signal 235 travels towards the polarization beam splitter 220, thereby combining the second and fourth light beams/optical signals 233 and 235 to form a second composite (e.g., two-channel) optical signal 237.

The first composite optical signal 215 from the first filter 210 passes through the polarization beam splitter 220, whereas the second composite optical signal 237 from the second filter 230 is reflected by the polarization beam splitter 220. Thus. the polarization beam splitter 220 may be substantially or completely transparent to the polarization type (e.g., p-polarization) of the light in the first composite optical signal 215, but reflective of the polarization type (e.g., s-polarization) of the light in the second composite optical signal 237. The second composite optical signal 237 is aligned with a target location on the surface of the polarization beam splitter 220 facing away from the first filter 210 where the first composite optical signal 215 emerges after passing through the polarization beam splitter 220. and the polarization beam splitter 220 is positioned or angled such that the second composite optical signal 237 is reflected along the same path that the first composite signal 215 travels towards a second target (e.g., a waveguide, or a filter and/or lens for an output port of an optical transmitter; not shown in FIG. 3), thereby combining the first, second, third and fourth light beams to form a multichannel (e.g., four-channel) optical signal 225.

The first filter 210 is orthogonal to the polarization beam splitter 220, whereas the second filter 230 is parallel to the polarization beam splitter 220. In the embodiment shown in FIG. 3 (as well as the other Figures), each of the filters 210 and 230 and the polarization beam splitter 220 are at 45° angles to each of (i) the beam/signal passing through it and (ii) the beam/signal reflected by it, but other angles to the beam/signal passing through and/or the beam/signal reflected by the filter and/or polarization beam splitter may be suitable. Also, additional signals can be combined using additional filters (e.g., beam splitters or dichroic mirrors) that are wavelength-selective (e.g., transparent to either the multichannel optical signal 225 or to the additional signal[s], and reflective of the other), but polarization-independent (i.e., where the transparency/reflectivity is the same for a given wavelength or wavelength band, regardless of the polarization type[s] of the signal[s]).

The first through fourth laser diodes LD1-LD4 can have a sequential wavelength configuration (e.g., in which the center wavelength of LD1 is v, the center wavelength of LD2 is v+x, the center wavelength of LD3 is v+y, and the center wavelength of LD4 is v+z, where x, y and z are each >0 and $x<y<z$). The difference (e.g., increase or decrease) between center wavelengths of adjacent laser diodes may be monotonic (e.g., y is about or equal to 2x, and z is about or equal to 3x). The difference between center wavelengths of adjacent laser diodes, as well as the order of the laser diodes, can be random. In the case of a sequential increase or decrease in the center wavelength, the optical multiplexer 200 allows for a larger gap or difference between the center wavelength of the first laser diode LD1 and the third laser diode LD3, and between the center wavelength of the second laser diode LD2 and the fourth laser diode LD4, and smaller gaps or differences between the center wavelengths of the first and second laser diodes LD1 and LD2, the second and third laser diodes LD2 and LD3. and the third and fourth laser diodes LD3 and LD4. This advantage enables wavelength multiplexing using filters (and optionally, mirrors) oriented at a 45° angle with respect to the beam emitted by a respective laser diode, thereby enabling narrow channel spacing that cannot be done otherwise using adjacent channel multiplexing.

A Third Exemplary Multiplexer for a Multi-Channel Optical Transmitter

Figure 4:
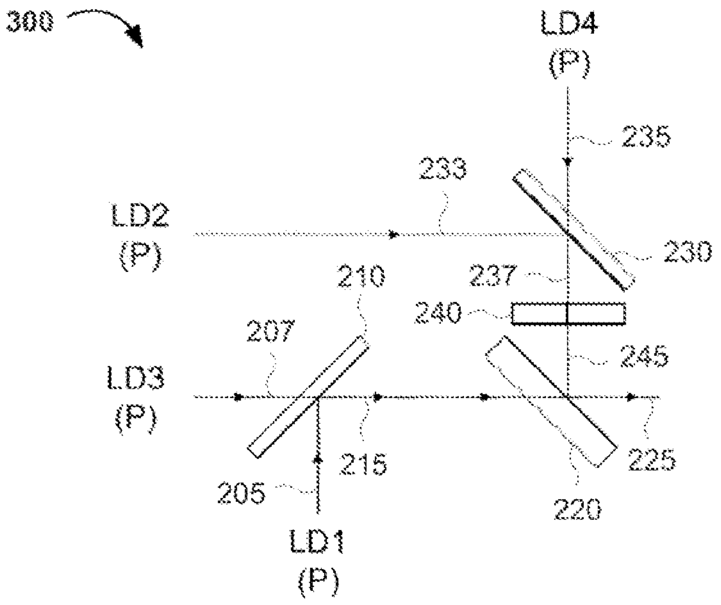
FIG. 4 is a diagram of a third exemplary free space optical signal multiplexer in accordance with embodiments of the present invention.

FIG. 4 shows an exemplary multiplexer 300 for a multi-channel optical transmitter similar to the exemplary multiplexer 200 of FIG. 3, but with some differences. The exemplary multiplexer 300 is configured to combine four optical signals (e.g., polarized light emitted by first, second, third and fourth laser diodes LD1, LD2, LD3 and LD4, corresponding to a four-channel apparatus), but in this case, the four optical signals all have the same orientation (e.g., they all emit light having the same polarization type). As for the exemplary multiplexer 200 of FIG. 3, more or less channels may be multiplexed by the exemplary multiplexer 300 of FIG. 4 in accordance with the present invention.

The exemplary multi-channel multiplexer 300 of FIG. 4 comprises first filter 210, polarization beam splitter 220, second filter 230, and half wave plate (HWP) 240. The overall function and operation of multi-channel multiplexer 300 is similar to multi-channel multiplexers 100, 100' and 200 in FIGS. 2A-3, but in the exemplary multi-channel multiplexer 300 of FIG. 4, the polarization type of the second composite optical signal 237 is changed (e.g., the signal is rotated by about 90°) before impinging on the polarization beam splitter 220.

In the example shown in FIG. 4, the first and third light beams 205 and 207 are combined to form the composite optical signal 215, and the second and fourth light beams 233 and 235 are combined to form the composite optical signal 237, in the same way as in FIG. 3. However, the second and fourth light beams 233 and 235 have the same polarization type (e.g., p-polarization) as the first and third light beams 205 and 207, and as a result, the second composite optical signal 237 will not be reflected by the polarization beam splitter 220. Consequently, the HWP 240 is placed between the second filter 230 and the polarization beam splitter 220 in a location and/or a position (e.g., at an angle with respect to the second composite optical signal 237) to change the polarization type of the second composite optical signal 237 (e.g., to s-polarization). In one embodiment, the HWP 240 rotates the polarization angle of the second composite optical signal 237 by a predetermined amount (in this case, 90°) to generate a rotated composite optical signal 245 that can be reflected by the polarization beam splitter 220.

In the example of FIG. 4, the HWP 240 is orthogonal to the second composite optical signal 237, and the rotated composite optical signal 245 emerges from the HWP 240 at an angle of 0° with respect to the second composite optical signal 237, but other orientation angles to the second composite optical signal 237 may be suitable. In the case where an element receiving a composite optical signal (e.g., HWP 240 or polarization beam splitter 220) refracts any of the individual light beams in the composite optical signal at a different angle than other light beam(s) in the composite optical signal, a focusing lens may be included in the path of the emergent composite optical signal to focus the composite optical signal on a particular target (in the example of FIG. 4, at the same location on the surface of polarization beam splitter 220 away from filter 210, where the rotated composite optical signal 245 is reflected).

A Fourth Exemplary Multiplexer for a Multi-Channel Optical Transmitter

Figure 5:
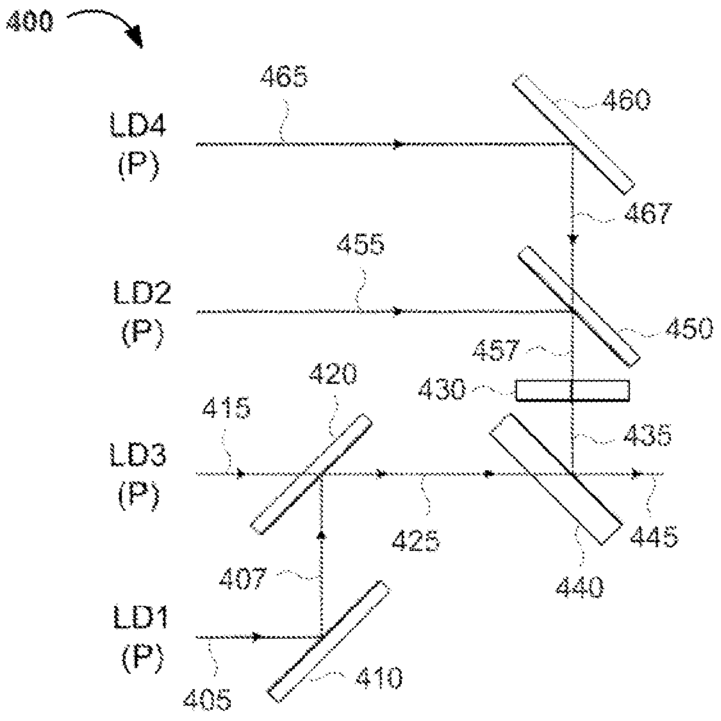
FIG. 5 is a diagram of a fourth exemplary free space optical signal multiplexer in accordance with embodiments of the present invention.

FIG. 5 shows an exemplary multiplexer 400 for a multi-channel optical transmitter similar to the exemplary multiplexer 300 of FIG. 4, but with some differences. The exemplary multiplexer 400 combines four parallel optical signals (e.g., polarized light pulses) emitted by first, second, third and fourth laser diodes LD1, LD2, LD3 and LD4 that are located at and/or aligned along a common end of the TOSA. The four emitted light beams or optical signals 405, 415, 455 and 465 all have the same polarization type (e.g., p-polarization). As for the exemplary multiplexer 300 of FIG. 2, a HWP 430 changes the polarization type of the second composite optical signal 457 before it reaches the polarization beam splitter 440. However, if the second and fourth light beams or optical signals 455 and 465 have a polarization type different from the first and third light beams or optical signals 405 and 415, then the second composite optical signal 457 will be reflected by the polarization beam splitter 440, and the HWP 430 can be omitted.

The exemplary multi-channel multiplexer 400 of FIG. 5 comprises first mirror 410, first filter 420, HWP 430, polarization beam splitter 440, second filter 450, and second mirror 460. The overall function and operation of multi-channel multiplexer 400 is similar to multi-channel multiplexers 100, 100', 200 and 300 in FIGS. 2A-4, but in the exemplary multi-channel multiplexer 400 of FIG. 5, all of the laser diodes LD1, LD2. LD3 and LD4 are positioned along the same end of the TOSA and aligned so that all of the light beams 405, 415, 455 and 465 are parallel and of the same polarization type. This greatly facilitates reducing the size of the TOSA and simplifying the manufacturing process, as all of the essential laser diode components (e.g., the laser diodes and corresponding modulators) may be made on the same substrate.

In the example shown in FIG. 5, the first light beam 405 is reflected by the first mirror 410 towards a target on the surface of the first filter 420. The first mirror 410 can be or comprise a single facet mirror or a prism. The target is also the location where the third light beam 415 emerges after passing through the first filter 420. At this point, the first and third light beams 405 and 415 are combined to form a first composite optical signal 425. Similar to optical multiplexer 300 in FIG. 4, the first and third light beams 405 and 415 have the same polarization type (e.g., p-polarization) as the second and fourth light beams 455 and 465. As a result, the second composite optical signal 457 is passed through the HWP 430 to change its polarization type and generate a rotated composite optical signal 435 that can be reflected by the polarization beam splitter 440.

Similar to the first light beam 405, the fourth light beam 465 is reflected by a second mirror 460 towards a target on the surface of the second filter 450. The target is also the location where the second light beam 455 is reflected by the second filter 450. At this point, the reflected fourth light beam 467 and the second light beam 455 are combined to form a second composite optical signal 457. The second and fourth laser diodes LD2 and LD4, the second mirror 460, the second filter 450, and the HWP 430 are positioned and aligned so that the rotated composite optical signal 435 intersects a target on the surface of the polarization beam splitter 440 where the first composite optical signal 425 passes through to generate a multichannel optical signal 445 that can be output over the optical transmission medium (not shown).

A Fifth Exemplary Multiplexer for a Multi-Channel Optical Transmitter

Figure 6:
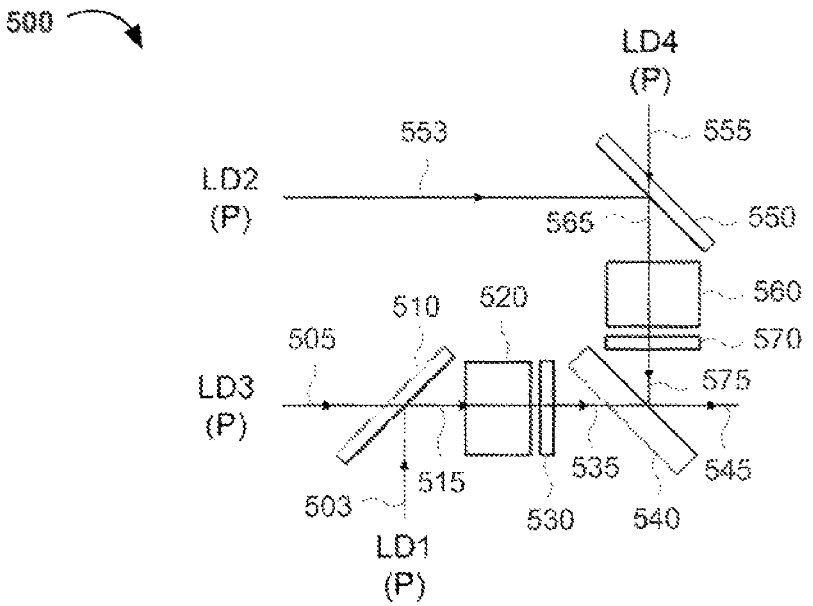
FIG. 6 is a diagram of a fifth exemplary free space optical signal multiplexer in accordance with embodiments of the present invention.

FIG. 6 shows an exemplary multiplexer 500 for a multi-channel optical transmitter similar to the exemplary multiplexer 200 of FIG. 3, but with some differences. The exemplary multiplexer 500 further includes a plurality of paired isolators and half wave plates configured to isolate and rotate the different composite optical signals prior to their combination at or by the polarization beam splitter. This configuration 500 avoids any necessity for an isolator (e.g., a polarization insensitive isolator) downstream from the multiplexer output 545.

The exemplary multi-channel multiplexer 500 of FIG. 6 comprises the same components as multiplexer 200 of FIG. 3 (e.g., first filter 210, polarization beam splitter 220, and second filter 230), but further includes first isolator 520, first HWP 530, second isolator 560, and second HWP 570. The overall function and operation of multi-channel multiplexer 500 is similar to multi-channel multiplexer 200 in FIG. 3, but in the exemplary multi-channel multiplexer 500 of FIG. 6, all of the light beams emitted from the laser diodes LD1-LD4 have the same polarization type, the polarization type of the second composite optical signal 565 is changed before it is reflected by the polarization beam splitter 540, and all of the optical signals are effectively isolated prior to being combined at or by the polarization beam splitter 540. In one embodiment, the respective isolator/HWP pairs may have one of the components of the pair mounted on, affixed to, or otherwise in contact with the other component of the pair.

In the example shown in FIG. 6, the first and second isolators 520 and 560 isolate (e.g., block light travelling backwards or in the opposite direction) and rotate (e.g., by 45°) the composite optical signals 515 and 565, respectively. First and second isolators 520 and 560 may comprise, e.g., optical isolators. polarization dependent isolators, or Faraday isolators. The first HWP 530 adjacent to the first isolator 520 rotates the first composite optical signal 515 by a predetermined amount (e.g., a reverse or negative 45°) in the opposite direction as the first isolator 520. thereby preserving the polarization type of the first composite optical signal 515 (e.g., p-polarization). However, the second HWP 570 rotates the second composite optical signal 565 by a predetermined amount (e.g., 45°) in the same direction from the second isolator 560, thereby changing the polarization type of the second composite optical signal 565 (e.g., from p-polarization to s-polarization), while isolating the second composite optical signal 565. Alternatively, the different isolators may rotate the different composite optical signals in different directions, and the different half wave plates may rotate the isolated composite optical signals in the same direction (and, optionally, by the same amount). Also, various components of the isolators (e.g., a Faraday rotator, a quarter wave plate, birefringent wedge[s], etc.) may be combined in various ways to accomplish the same result (e.g., form or generate isolated composite optical signals with different polarization types). In fact, the HWPs 530 and 570 are not necessary as long as the polarization angles of the composite optical signals and 515 and 565 are orthogonal to each other, and the polarization angle of the polarization beam splitter 540 is orthogonal to one composite optical signal and parallel to the other composite optical signal.

A Sixth Exemplary Multiplexer for a Multi-Channel Optical Transmitter

Figure 7:
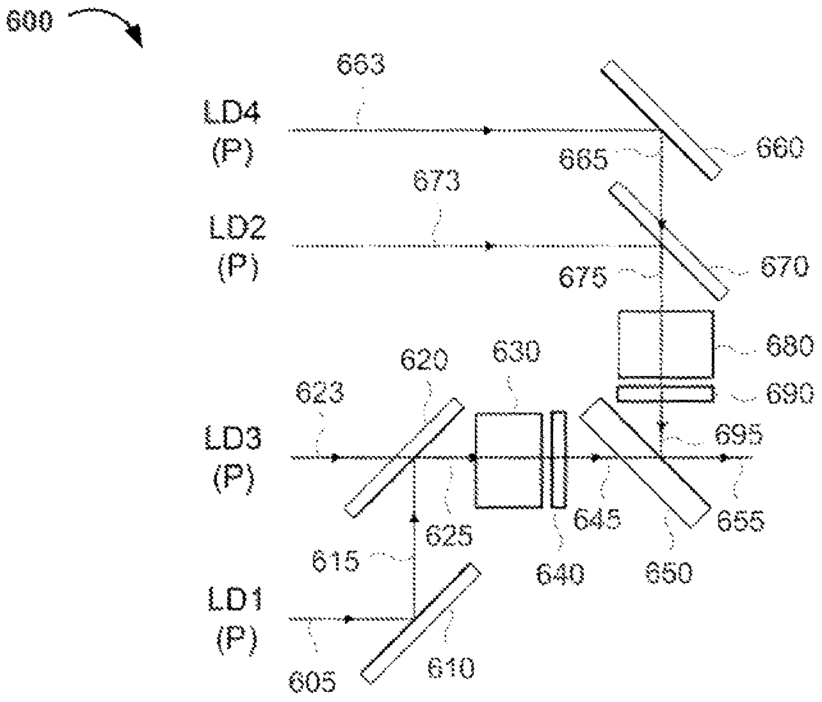
FIG. 7 is a diagram of a sixth exemplary free space optical signal multiplexer in accordance with embodiments of the present invention.

FIG. 7 shows an exemplary multiplexer 600 for a multi-channel optical transmitter based on the exemplary multiplexers 400 and 500 of FIGS. 5 and 6. The exemplary multiplexer 600 includes the isolator—wave plate pairs of FIG. 6 in the mirror—filter pair configuration of FIG. 6. Therefore, the multiplexer 600 of FIG. 7 provides the advantages of the optical multiplexers 400 and 500 of FIGS. 5 and 6 (e.g., all laser diodes LD1-LD4 can be mounted on the same side of the TOSA, and there is no need for an isolator downstream from the output of the multiplexer 600). The operations of first and second mirrors 610 and 660, first and second filters 620 and 670, and polarization beam splitter 650 is substantially the same as in FIG. 4, and the operations of first and second isolators 630 and 680 and of first and second HWPs 640 and 690 is substantially the same as in FIG. 6.

A Seventh Exemplary Multiplexer for a Multi-Channel Optical Transmitter

Figure 8A:
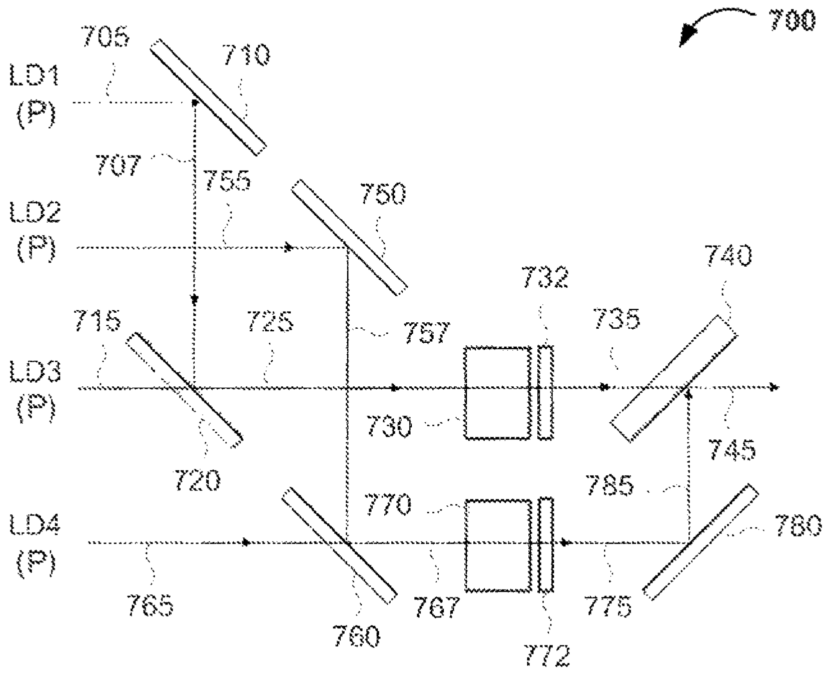
FIGS. 8A-B are diagrams of a seventh exemplary free space optical signal multiplexer in accordance with embodiments of the present invention.
Figure 8B:
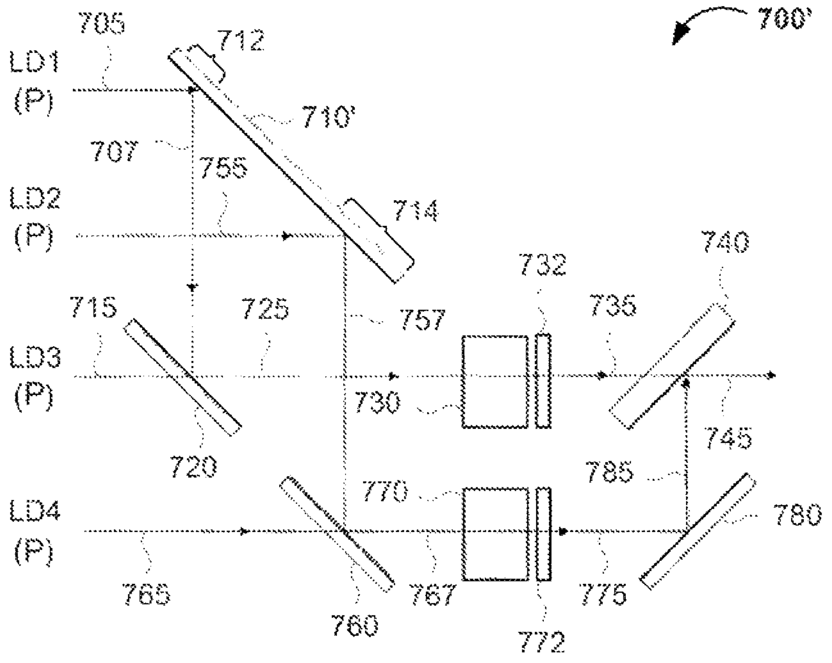

FIGS. 8A-B show exemplary optical multiplexers 700 and 700' for a multi-channel optical transmitter similar to the exemplary multiplexer 600 of FIG. 7. The exemplary multiplexers 700 and 700' include the isolator—wave plate pairs of FIGS. 6 and 7, and either a third mirror (e.g., mirror 710 in FIG. 8A) or a “dual-signal” mirror (e.g., mirror 710' in FIG. 8B). The multiplexers 700 and 700' of FIGS. 8A-B provide the advantages of the optical multiplexer 600 of FIG. 7 (e.g., all laser diodes LD1-LD4 can be mounted on the same side of the TOSA, and there is no need for an isolator downstream from the output of the multiplexer 700/700'), and the laser diodes LD1-LD4 can be mounted in sequence. Because each isolator—HWP pair is collinear with a mirror—filter pair (e.g., filter 760 and mirror 780) or with a filter (e.g., filter 720) and the polarization beam splitter 740 along a linear signal path directly from a laser diode, the optical multiplexers 700 and 700' can be relatively compact in comparison with the optical multiplexer 600 of FIG. 7, even though it may include an additional component. Furthermore, the polarization beam splitter 740 and the mirror/reflector 780 can be combined to form a single pre-assembled unit, similar to that shown in FIG. 2C.

Referring now to FIG. 8A, the optical signal 705 from the first laser diode LD1 is reflected by first mirror 710 towards a first target on the surface of the first filter 720. The first target is the location on the first filter 710 where the optical signal 715 from the third laser diode LD3 passes through the first filter 720. The reflected first optical signal 707 and the third optical signal 715 are combined at the first target to form the first composite optical signal 725, which passes through first isolator 730 and first HWP 732 in the same manner as first isolator 520 and first HWP 530 in FIG. 6 to form a rotated and/or isolated composite optical signal 735.

Similarly, the optical signal 755 from the second laser diode LD2 is reflected by second mirror 750 towards a second target on the surface of the second filter 760. The second target is the location on the second filter 760 where the optical signal 765 from the fourth laser diode LD4 passes through the second filter 760. The reflected second optical signal 757 and the fourth optical signal 715 are combined at the second target to form the second composite optical signal 767, which passes through second isolator 770 and second HWP 772 in the same manner as second isolator 560 and second HWP 570 in FIG. 6 to form isolated composite optical signal 775.

The isolated composite optical signal 775 is reflected by third mirror 780 towards a third target on the surface of the polarization beam splitter 740. The third target is the location on the polarization beam splitter 740 where the rotated and/or isolated optical signal 735 passes through the polarization beam splitter 740. The reflected isolated composite optical signal 785 and the rotated and/or isolated optical signal 735 are combined at the third target to form the multichannel optical signal 745, suitable for output over an optical medium (not shown).

The optical multiplexer 700' of FIG. 8B differs from the optical multiplexer 700 of FIG. 8A in that the mirrors 710 and 750 in FIG. 8A are combined into a single mirror 710' in FIG. 8B. It is not necessary for the mirrors in the optical multiplexers of FIGS. 8A-B to be wavelength-selective (e.g., reflective of light having a first wavelength or wavelength band, and transmissive or transparent to light having a second wavelength or wavelength band different from the first wavelength or wavelength band). Consequently, a nonselective mirror (e.g., one that reflects light over a wavelength range encompassing both [i] the first and second light beams/optical signals 705 and 707, and/or [ii] the second and fourth light beams/optical signals 755 and 765) can be employed as the first, second or third mirror.

Furthermore, the optical multiplexers 700 and 700' are not limited to combining polarized optical signals. The benefits of the reduction in TOSA and/or transmitter size provided by folding many of the optical signals and crossing at least one or two of the optical signals over other optical signals can be applied to optical transmitters that transmit non-polarized or non-collimated light. As a result, in such embodiments (as well as in embodiments where the optical signals have different polarities), isolators and half wave plates are not necessary.

An Eighth Exemplary Multiplexer for a Multi-Channel Optical Transmitter

Figure 9A:
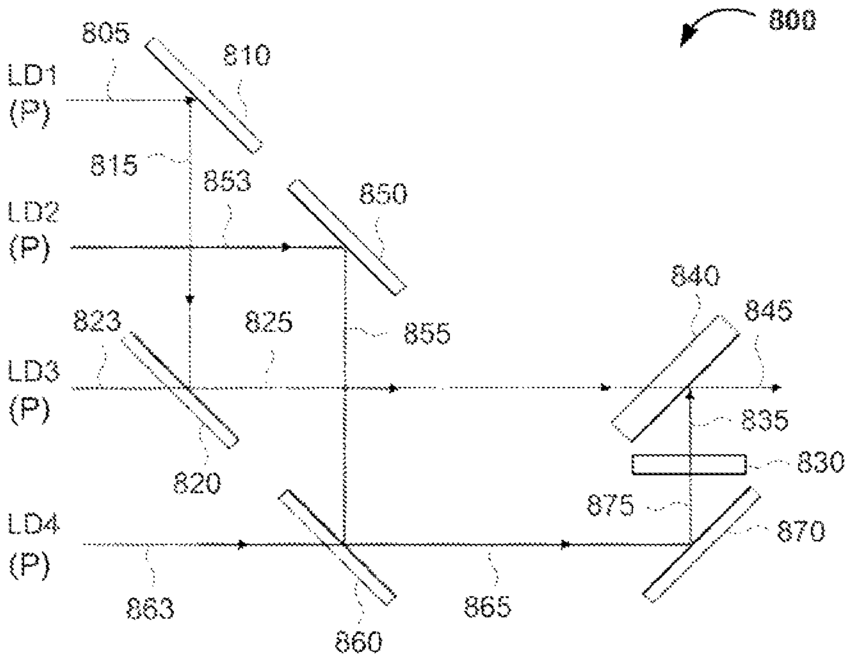
FIGS. 9A-B are diagrams of an eighth exemplary free space optical signal multiplexer in accordance with embodiments of the present invention.
Figure 9B:
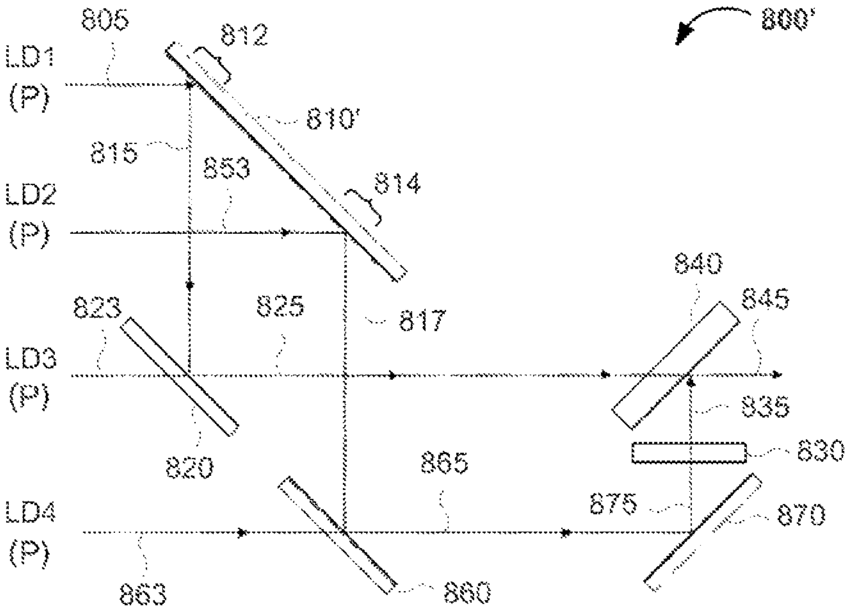

FIGS. 9A-B show exemplary optical multiplexers 800 and 800' for a multi-channel optical transmitter similar to the exemplary multiplexers 700 and 700' of FIGS. 8A-B. The exemplary multiplexers 800 and 800' are substantially the same as the exemplary multiplexers 700 and 700' of FIGS. 8A-B, except that a single half wave plate (HWP) replaces the isolator—wave plate pairs of FIGS. 8A-B. As for the exemplary multiplexers 700 and 700' of FIGS. 8A-B, the exemplary optical multiplexers 800 and 800' of FIGS. 9A-B include a third mirror (e.g., mirror 810 in FIG. 9A) or a "dual-signal" mirror (e.g., mirror 810' in FIG. 9B). The multiplexers 800 and 800' of FIGS. 9A-B provide many of the advantages of the optical multiplexers 700 and 700' of FIGS. 8A-B (e.g., all laser diodes LD1-LD4 can be mounted on the same side of the TOSA and have the same polarization type), and the same advantages of the optical multiplexers 300 and 400 of FIGS. 4-5.

The optical multiplexers 800 and 800' of FIGS. 9A-B operate in substantially the same way as each other and as the exemplary multiplexers 700 and 700' of FIGS. 8A-B, except that the HWP 830 changes the polarization type of the second composite optical signal 875 (comprising the reflected second optical signal 817 and the fourth optical signal 863). For example, in one embodiment, the HWP 830 rotates the second composite optical signal 875 by 90°. Thus, if the optical signals from the first through fourth laser diodes LD1-LD4 have the same polarization type (e.g., p-polarization), the second composite optical signal 875 becomes an alternately polarized (e.g., s-polarized) composite optical signal 835 after passing through the HWP 830. As in other embodiments, the s-polarized composite optical signal 835 is reflected by the polarization beam splitter 840 at a target location where the first composite optical signal 825 passes through the polarization beam splitter 840, thereby combining the two composite optical signals 835 and 825 to form a multichannel optical signal 845, suitable for output over an optical medium (not shown).

Figure 10A:
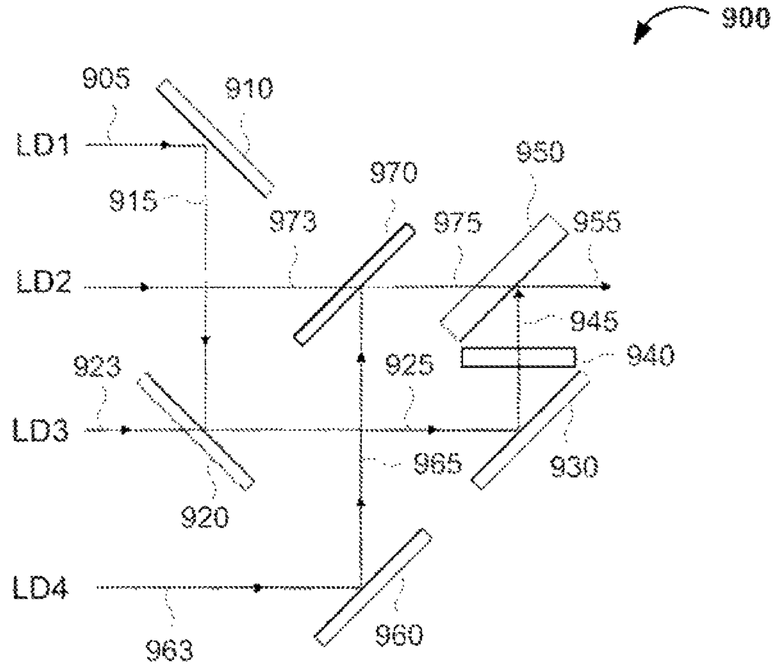
FIGS. 10A-B are diagrams of an ninth exemplary free space optical signal multiplexer in accordance with embodiments of the present invention.
Figure 10B:
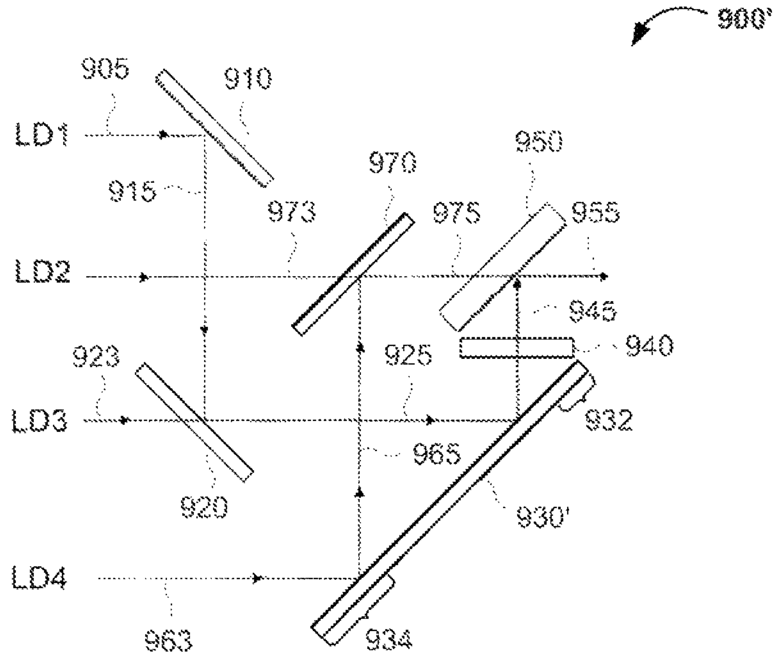

FIGS. 10A-B show alternative exemplary optical multiplexers 900 and 900' for a multi-channel optical transmitter similar to the exemplary multiplexers 800 and 800' of FIGS. 9A-B. The exemplary multiplexers 900 and 900' are substantially the same as the exemplary multiplexers 800 and 800' of FIGS. 9A-B, but the differences include the mirror 960 reflecting the optical signal 963 from the fourth laser LD4 towards a target on the surface of the filter 970, rather than from the second laser LD2 as shown in FIGS. 8A-9B the second optical signal 973 and the reflected fourth optical signal 965 are combined by the filter 970 to form the second composite optical signal 975; and the first composite optical signal 925 (i.e., the combined reflected first optical signal 915 and third optical signal 923) are reflected by the mirror 930 and rotated by HWP 940 towards the polarization beam splitter 950. Also, mirror 960 and filter 970 have faces that are (i) orthogonal to faces of mirror 910 and filter 920 and (ii) parallel to faces of mirror 930 and polarization beam splitter 950, opposite to the spatial/geometric relationships of mirror 850 and filter 860 to mirror 810, filter 820, mirror 870 and polarization beam splitter 840 in FIG. 9A.

As for the exemplary multiplexers 700, 700', 800 and 800' of FIGS. 8A-9B, the exemplary optical multiplexers 900 and 900' of FIGS. 10A-B include three mirrors (e.g., mirrors 910, 930 and 960 in FIG. 10A) or a "dual-signal" mirror (e.g., mirror 930' in FIG. 10B). The multiplexers 900 and 900' of FIGS. 10A-B provide substantially the same advantages of the optical multiplexers 800 and 800' of FIGS. 9A-B (e.g., all laser diodes LD1-LD4 can be mounted on the same side of the TOSA in sequence, and have the same polarization type).

The optical multiplexers 900 and 900' of FIGS. 10A-B operate in substantially the same way as each other and as the exemplary multiplexers 800 and 800' of FIGS. 9A-B, except that the HWP 940 changes the polarization type of the reflected first composite optical signal 935 (comprising the reflected first optical signal 915 and the third optical signal 923). However, if the first and third optical signals 915 and 923 have a first polarization type (e.g., s-polarization), and the second and fourth optical signals 973 and 963 have a second polarization type (e.g., p-polarization), then the HWP 940 is not necessary (the same principle applies to the optical multiplexers 800 and 800' in FIGS. 9A-B). Thus, similar to other embodiments, the rotated (or s-polarized) composite optical signal 945 is reflected by the polarization beam splitter 950 at a target location where the other (e.g., p-polarized) composite optical signal 975 passes through the polarization beam splitter 950, thereby combining the two composite optical signals 945 and 975 to form a multichannel optical signal 955, suitable for output over an optical medium (not shown).

Figure 11:
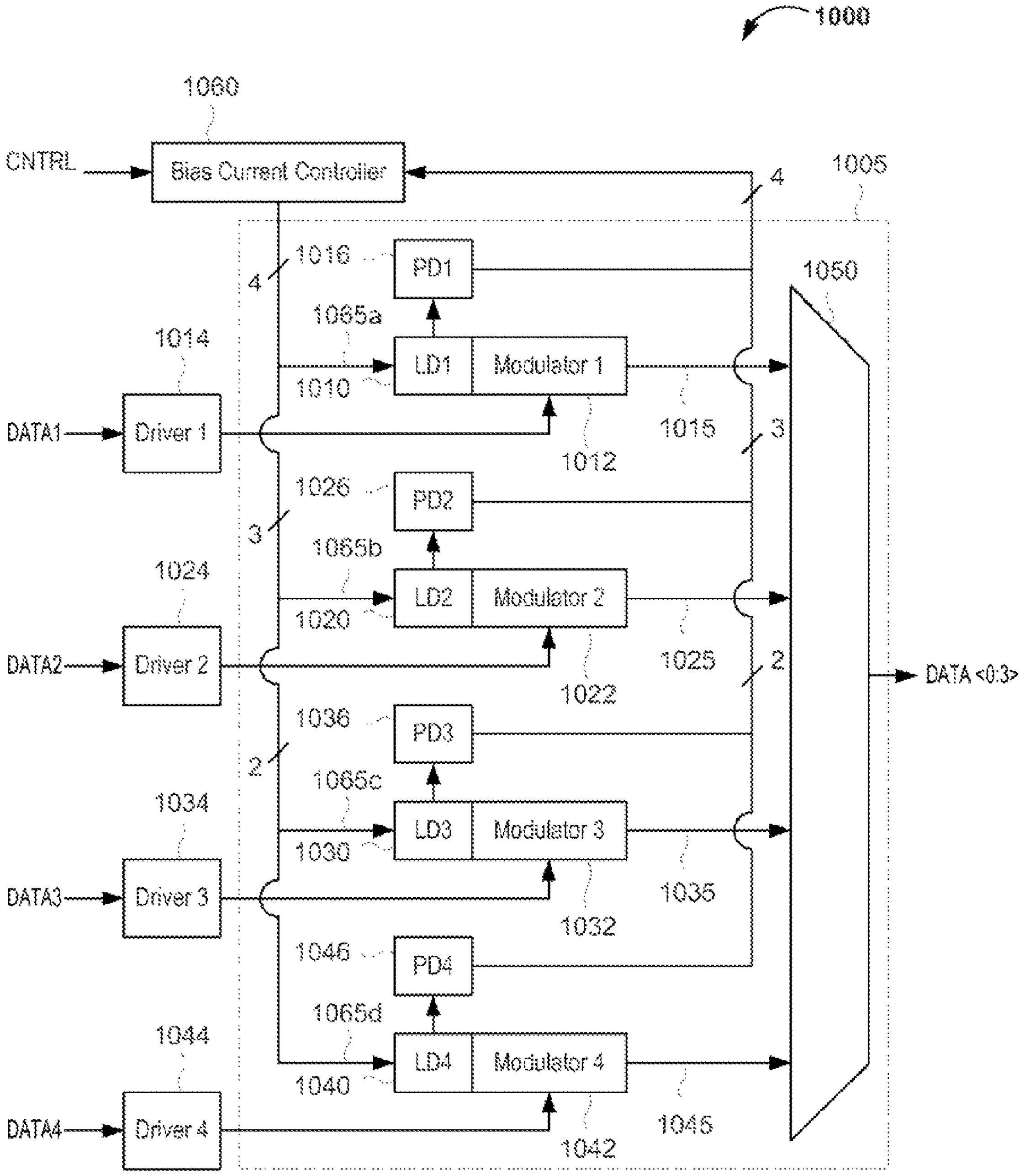
FIG. 11 is a block diagram of an exemplary multi-channel transmitter optical sub-assembly (TOSA) in accordance with embodiments of the present invention.

An Exemplary Transmitter Optical Subassembly, Optical Transmitter and Optical Transceiver FIG. 11 illustrates an exemplary multichannel optical transmitter 1000 and multichannel transmitter optical subassembly (TOSA) 1005. The TOSA 1005 comprises first-fourth lasers 1010, 1020, 1030 and 1040 (e.g., laser diodes LD1-LD4), coupled (and optional) first-fourth modulators 1012, 1022, 1032 and 1042 (e.g., Modulator 1-Modulator 4). first-fourth monitoring detectors 1016, 1026, 1036 and 1046 (e.g., photodiodes PD1-PD4), and optical multiplexer 1050. In general, the laser-modulator pairs 1010-1012, 1020-1022, 1030-1032 and 1040-1042 output a polarized beam, but in embodiments where the modulator does not output a polarized beam, a polarizer may be located in a position configured to polarize the light beam output by the modulator. Optical transmitter 1000 comprises first-fourth drivers 1014, 1024, 1034 and 1044, bias current controller 1060 (e.g., a microcontroller, an ASIC or a microprocessor), and TOSA 1005. In the embodiment shown in FIG. 11. optical multiplexer 1050 can be any of the exemplary four-channel optical multiplexers disclosed herein.

Each channel of the multichannel optical transmitter 1000 generally comprises a driver, a laser, a modulator, and a monitoring detector (e.g., first driver 1014, first laser diode 1010, first modulator 1012, and first photodiode 1016). Each channel may further comprise a collimator between the modulator and the multiplexer 1050. A description of an exemplary signal transmission operation of one of the channels follows.

A laser 1010 (e.g., laser diode LD1) emits light having a predetermined or characteristic center wavelength at a power or intensity related or proportional to a voltage, current or other signal (e.g., control signal) 1065 from bias current controller 1040. A modulator 1012 modulates the light emitted from laser 1010 in accordance with an electrical data signal (e.g., DATA1) from a driver circuit 1014. Thus, the paired laser 1010 and modulator 1012 may comprise an electromodulated laser (EML), but other types of lasers may also be used, such as quantum cascade lasers, directly modulated lasers (which do not need a modulator; e.g., distributed feedback lasers), etc. The data signal DATA1 may be single-ended or differential, and may come from an external host device to which the optical transmitter 1000 is coupled, either directly or through an electrical interface (not shown) on the optical transmitter 1000 or an optical transceiver including the optical transmitter. The driver 1014 then applies a voltage across, or sinks or sources a current to or from, the modulator 1012 in accordance with the data signal DATA1.

Monitoring detector 1016 (e.g., photodiode PD1, which in one embodiment, is a back-facet monitoring photodiode optically coupled to the back side of the first laser 1010) detects a small part of the light emitted from the laser 1010 and transmits a feedback signal to the bias current controller 1060. Alternatively, the monitoring detector 1016 can receive a small amount of the optical signal output by the modulator 912 (e.g., using a mirror that is substantially. but not completely, transparent to light having the wavelength of the optical signal). The light detected by the monitoring detector 1016 may be polarized or unpolarized. Bias current controller 1060 determines the output power or intensity of the light emitted from the laser 1010, and increases, decreases or maintains the voltage or current applied to the laser 1010 using a control signal 1065*a*. A collimator and lens (not shown) may collimate and focus the light 1015 emitted from the laser 1010 and/or modulator 912 towards the optical multiplexer 1050. Optical multiplexer 1050 combines the polarized optical signals 1015, 1025, 1035 and 1045 in any manner discussed herein for output on an optical medium (not shown). A second lens (not shown) may focus or re-focus the multi-channel optical signal DATA<0:3>, either at the output of the optical multiplexer 1050 or at the input port of the optical medium.

The present invention further relates to an optical transceiver, comprising the present TOSA, and an optical receiver configured to receive and process a multi-channel optical signal. The received multi-channel optical signal generally has a number of channels equal to the number of channels of the multichannel optical communication system or network. The optical receiver may comprise a number of photodiodes and an equal number of electrical amplifiers, the number of photodiodes and amplifiers generally being equal to the number of channels in the multichannel optical communication system or network. The optical receiver generally receives an optical signal in or on a unique channel of the multichannel optical communication system or network, and converts the optical signal to an electrical signal for further processing (e.g., by a host device in electrical communication with the optical receiver). Each amplifier amplifies a respective electrical signal from the corresponding photodiode.

Figure 12:
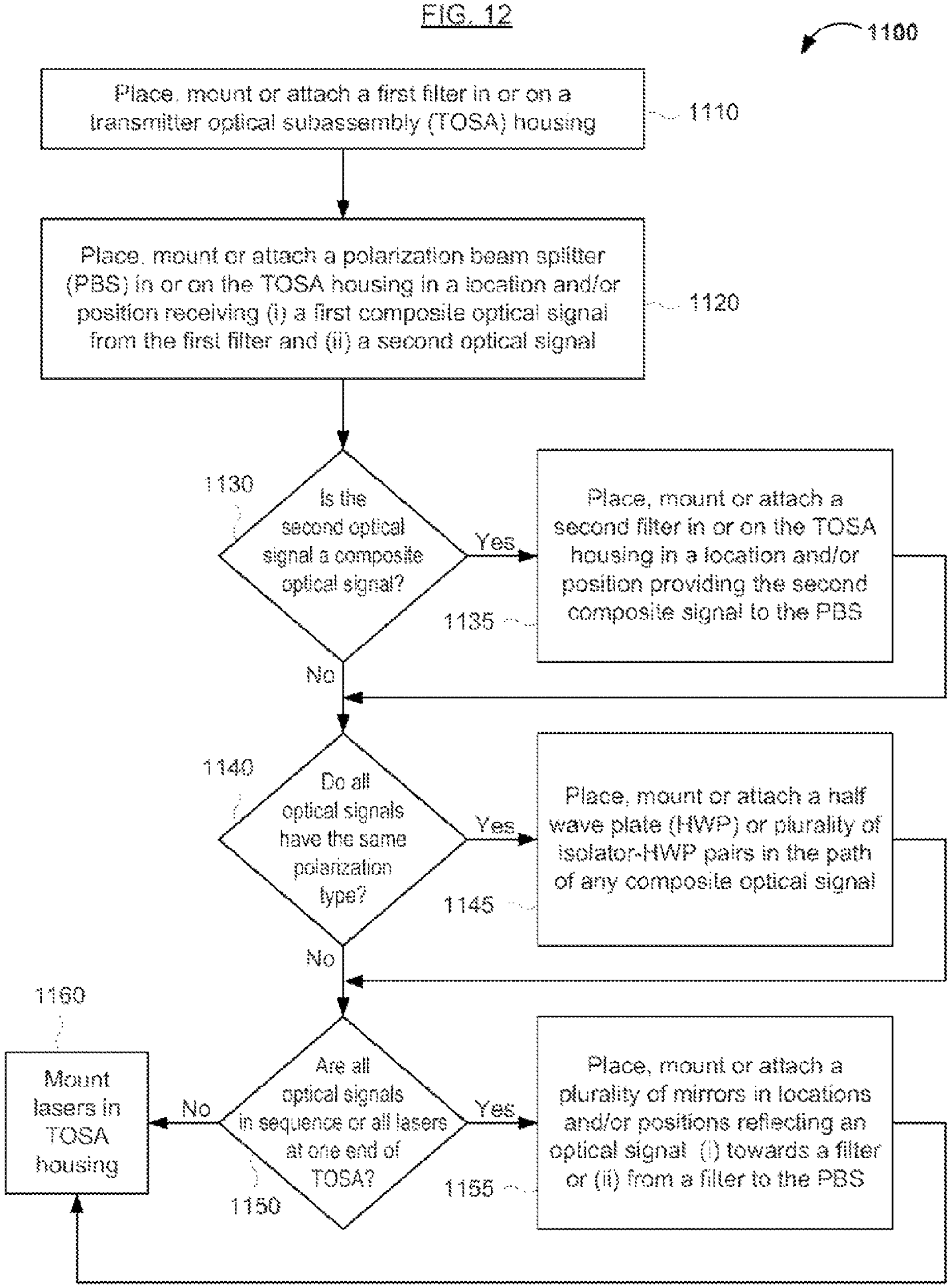
FIG. 12 is a flow chart for an exemplary method of making an optical multiplexer in accordance with embodiments of the present invention.

An Exemplary Method of Making and/or Designing a Transmitter Optical Subassembly FIG. 12 is a flow chart 1100 illustrating an exemplary method for making a transmitter optical subassembly (TOSA) in accordance with embodiments of the present invention. At 1110, a first filter is placed, secured, affixed, adhered, mounted or attached in or to a first location in the TOSA housing. The TOSA housing is generally pre-formed, and may comprise a molded plastic housing, a stamped metal housing with an insulating liner therein, etc. with one side or end open to enable placement of the TOSA components in the housing. At the end of the manufacturing process, the open end or side of the housing is sealed with a further component of the housing (e.g., the missing end or side). The first filter is configured to form a first composite optical signal (i.e., first and second polarized optical signals) by reflecting a first polarized optical signal towards a first target (e.g., a location on a surface of a polarization beam splitter) and allowing a second polarized optical signal to pass through towards the first target. Thus, the first filter is generally placed in a location and in a position in the TOSA housing enabling such functionality. Although placing securing. affixing, adhering, mounting or attaching the first filter in the TOSA housing is the first step in the flow 1100 in FIG. 12, any actual manufacturing method can perform a different step first, and perform this step later in the manufacturing process.

At 1120, a polarization beam splitter is placed, secured, affixed, adhered, mounted or attached in or to a second location in the TOSA housing. The polarization beam splitter is configured to combine the first composite signal (i.e., the first and second polarized optical signals) with at least a third polarized optical signal by either (i) reflecting the third polarized optical signal towards a second target (e.g., the TOSA output port, which may have a filter and/or lens therein or thereon, and which may have a fixture therein for connecting the optical transmission medium thereto) and allowing the first and second polarized optical signals to pass through towards the second target, or (ii) reflecting the first and second polarized optical signals towards the second target and allowing the third polarized optical signal to pass through towards the second target. Each of the first, second and third polarized optical signals has a unique center wavelength corresponding to a channel of a multichannel optical communication system or network. The first and second targets are generally different, although in some embodiments they may be the same (e.g., where the first composite signal passes through the polarization beam splitter). The polarization beam splitter is generally placed in a location and in a position in the TOSA housing enabling such functionality.

At 1130, when the TOSA includes a second composite signal (i.e., a fourth channel), the method further comprises placing, securing, affixing, adhering, mounting or attaching a second filter in or to a third location in the TOSA housing at 1135. The second filter forms the second composite optical signal by combining the third polarized optical signal with a fourth polarized optical signal. This can be done by either (i) reflecting the third polarized optical signal towards the polarization beam splitter and allowing the fourth polarized optical signal to pass through towards the polarization beam splitter, or (ii) reflecting the fourth polarized optical signal towards the polarization beam splitter and allowing the third polarized optical signal to pass through towards the polarization beam splitter. The second filter is generally placed in a location and in a position in the TOSA housing enabling the second composite signal to be provided to the polarization beam splitter for combination with the first composite signal. If the TOSA does not include a second composite signal, a second filter is not placed in the TOSA housing.

At 1140, if all of the optical signals in the TOSA have the same polarization type (e.g., s-polarization or p-polarization), then at 1145, a half wave plate (HWP) is placed, secured, affixed, adhered, mounted or attached in or to a location in the TOSA housing where a composite optical signal will pass through it before impinging on the polarization beam splitter. Alternatively, if the composite optical signals are to be isolated, a plurality of isolator—HWP pairs are placed, secured, affixed, adhered, mounted or attached in or to locations in the TOSA housing so that each composite optical signal will pass through a respective or corresponding isolator—HWP pair before being combined at the polarization beam splitter. If the optical signals do not all have the same polarization type, then it is not necessary to place an HWP in the TOSA housing, although it may be desired or beneficial to place an isolator in the path of each composite optical signal.

At 1150, if the optical signals are in sequence (i.e., the second laser is between and substantially collinear with the first and third lasers, and when a fourth laser is present, the third laser is between and substantially collinear with the second and fourth lasers), or the lasers are all at one end of the TOSA (e.g., they are on a common substrate), a plurality of mirrors may be placed, secured, affixed, adhered, mounted or attached in or to locations in the TOSA housing where one or more polarized optical signals will be reflected towards a filter (e.g., for combination with another polarized optical signal), or where a composite optical signal will be reflected towards the polarization beam splitter (PBS), at 1155. If the optical signals are not in sequence, then it is not necessary to place any mirrors in the TOSA housing, although it may be desired or beneficial to place one or more mirrors in the TOSA housing to accommodate certain laser-filter-PBS arrangements. At 1160, the lasers (e.g., laser diodes) are mounted in the TOSA housing.

In this method, it is not necessary to place certain components in the TOSA housing in a particular order, although for logistical reasons, it may be beneficial to place the components in their locations temporarily (e.g., using a curable adhesive), adjust the locations during optical signal alignment (e.g., as described herein), then fix the final, aligned locations of the components by curing the adhesive (e.g., using UV irradiation). Thus, the method may further comprise adjusting one or more locations of one or more components to align the various optical signals (e.g., the first and second optical signals with the first target), then permanently fixing the locations and positions of the components when all signals are aligned (e.g., the multichannel optical signal is aligned with the second target).

An Exemplary Method Transmitting Optical Signals

In yet another aspect, the present invention relates to a method of combining a plurality of polarized optical signals, comprising combining first and second polarized optical signals by reflecting a first polarized optical signal towards a first target and allowing a second polarized optical signal to pass through towards the first target, and combining the first and second polarized optical signals with a third polarized optical signal. The first, second and third polarized optical signals may be combined by either (i) reflecting the third polarized optical signal towards a second target and allowing the first and second polarized optical signals to pass through towards the second target, or (ii) reflecting the first and second polarized optical signals towards the second target and allowing the third polarized optical signal to pass through towards the second target. Each of the first, second and third polarized optical signals has a unique center wavelength corresponding to a channel of a multichannel optical communication system or network. As described above, the first and second targets are generally different, but in some embodiments, the first and second targets may be the same.

In some embodiments of the method, and as generally described herein, a first filter combines the first and second polarized optical signals, and a polarization beam splitter combines the third polarized optical signal with the first and second polarized optical signals. Further embodiments of the method comprise combining a fourth polarized optical signal with the third polarized optical signal by either (i) reflecting the third polarized optical signal towards the polarization beam splitter and allowing the fourth polarized optical signal to pass through towards the polarization beam splitter, or (ii) reflecting the fourth polarized optical signal towards the polarization beam splitter and allowing the third polarized optical signal to pass through towards the polarization beam splitter, as generally described herein.

Figure 13:
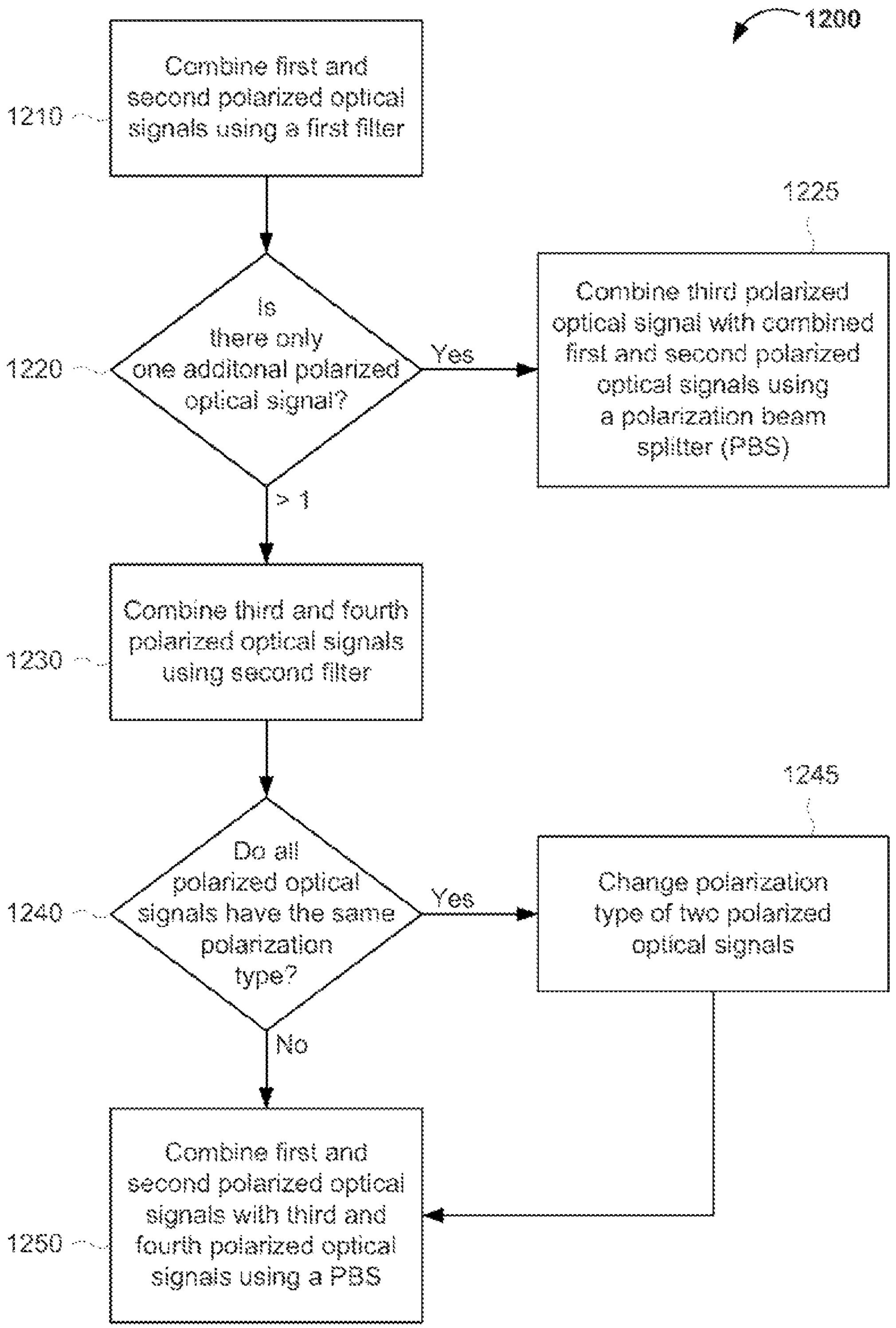
FIG. 13 is a flow chart for an exemplary method of combining and/or transmitting optical signals using an optical multiplexer in accordance with embodiments of the present invention.

FIG. 13 is a flow chart 1200 illustrating an exemplary method for combining polarized optical signals. At 1210, first and second polarized optical signals are combined (e.g., to form a first composite optical signal) by reflecting the first polarized optical signal towards a first target (e.g., a location on a surface of a polarized beam splitter), and allowing the second polarized optical signal to pass through the reflecting device towards the first target. For example, the reflecting device is generally a wavelength-selective filter, as described herein. If, at 1220, there is only one additional polarized optical signal to be combined, then at 1225, the third polarized optical signal may be combined with the first and second polarized optical signals by reflecting the third polarized optical signal towards a second target and allowing the first and second polarized optical signals to pass through the reflecting device towards the second target. For example, this second reflecting device is also generally a wavelength-selective filter, as described herein, and the second target may be an output port of the TOSA, as described herein. Alternatively, the third polarized optical signal may be combined with the first and second polarized optical signals by reflecting the first and second polarized optical signals towards the second target and allowing the third polarized optical signal to pass through towards the second target.

If there is more than one additional polarized optical signal to be combined with the first composite optical signal at 1220, then third and fourth polarized optical signals are combined (e.g., at or by a second filter) at 1230 by substantially the same process as in the preceding paragraph to form a second composite optical signal. The second composite optical signal is generally aligned with the same first target as the first composite optical signal.

If all of the polarized optical signals have the same polarization type at 1240, then the polarization type of at least two (and, in a four-channel optical transmitter, only two) polarized optical signals (or one composite optical signal) is changed at 1245. The polarization type can be changed by passing the signal(s) through a HWP or an isolator-HWP (or quarter wave plate) pair as described herein. Thereafter, the first through fourth polarized optical signals (or the two composite optical signals) are combined at or by the PBS. However, if some of the polarized optical signals have a different polarization type at 1240, then the first through fourth polarized optical signals (or the two composite optical signals) can be directly combined at or by the PBS.

Conclusion(s)

Embodiments of the present invention advantageously provide multiplexers for transmitter optical subassemblies (TOSAs) using free space optics. The present multi-channel optical multiplexers have a relatively small size and relatively high coupling efficiency. The present invention further relates to optical transceivers including such multiplexers, optical and/or optoelectronic networks including such optical transceivers, and methods of making and/or using the optical multiplexers and/or the optical transmitters.

As mentioned above, more than four channels may be optically multiplexed in accordance with the present invention. For example, an eight-channel device can be made by combining two four-channel optical multiplexers in accordance with the description herein, reflecting the four-channel optical signal from a first optical multiplexer towards a filter using a mirror, and combining the first four-channel optical signal with the second four-channel optical signal by reflecting the second four-channel optical signal at the same location on the filter where the first four-channel optical signal emerges. Naturally, the filter must be substantially transparent or transmissive to the center wavelengths of the first four-channel optical signal and reflective towards the center wavelengths of the second four-channel optical signal. Various combinations of optical multiplexers, mirrors and filters can be used to multiplex optical signals on nearly any number of channels.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical multiplexer, comprising:

a first beam splitter, configured to combine first and second polarized optical signals by reflecting the first polarized optical signal towards a first target and allowing the second polarized optical signal to pass through towards the first target; and a polarization beam splitter, configured to combine the first and second polarized optical signals with a third polarized optical signal by either (i) reflecting the third polarized optical signal towards a second target and allowing the first and second polarized optical signals to pass through towards the second target, or (ii) reflecting the first and second polarized optical signals towards the second target and allowing the third polarized optical signal to pass through towards the second target;

a first wave plate configured to rotate the combined first and second polarized optical signals by a first predetermined angle prior to impinging on the polarization beam splitter;

a first isolator in series with and preceding the first wave plate, the first isolator configured to rotate the combined first and second polarized optical signals by a second predetermined angle;

a second isolator configured to rotate the third polarized optical signal by a third predetermined angle; and a second wave plate in series with and following the second isolator, the second wave plate being configured to rotate the third polarized optical signal by a fourth predetermined angle prior to impinging on the polarization beam splitter, the second wave plate having an opposite direction of polarization from the first wave plate, wherein each of the first, second and third polarized optical signals has an identical polarization type and a unique center wavelength, and the first and second targets are the same or different.

2. The optical multiplexer of claim 1, further comprising a second beam splitter configured to combine the third polarized optical signal with a fourth polarized optical. signal by either (i) reflecting the third polarized optical signal towards the polarization beam splitter and allowing the fourth polarized optical signal to pass through towards the polarization beam splitter, or (ii) reflecting the fourth polarized optical signal towards the polarization beam splitter and allowing the third polarized optical signal to pass through towards the polarization beam splitter.

3. The optical multiplexer of claim 1, wherein the polarization beam splitter reflects the third polarized optical signal and allows the first and second polarized optical signals to pass through, and the first beam splitter and the polarization beam splitter have faces that are orthogonal to each other.

4. The optical multiplexer of claim 1, wherein the polarization beam splitter reflects the first and second polarized optical signals towards the second target and allows the third polarized optical signal to pass through, and the first beam splitter and the polarization beam splitter have faces that are parallel to each other.

5. The optical multiplexer of claim 1, wherein a face of the first beam splitter is oriented at an angle of 45° relative to the first and second polarized optical signals, and the polarization beam splitter has a face that is oriented at an angle of 45° relative to the third polarized optical signal.

6. The optical multiplexer of claim 2, wherein each of the first, second, third and fourth polarized optical signals have an identical polarization type.

7. The optical multiplexer of claim 1, further comprising a first mirror configured to reflect one of the first and second polarized optical signals towards the first beam splitter.

8. The optical multiplexer of claim 7, further comprising a second mirror configured to reflect the third polarized optical signal towards the polarization beam splitter.

9. The optical multiplexer of claim 8, wherein each of the first, second and third polarized optical signals are parallel to each other before any of the first, second and third. polarized optical signals impinge upon the first beam splitter, the first mirror or the second mirror.

10. The optical multiplexer of claim 9, further comprising a second beam splitter configured to combine the third polarized optical signal with a fourth polarized optical signal by (i) reflecting the fourth polarized optical signal towards the polarization beam splitter and allowing the third polarized optical signal to pass through towards the polarization beam splitter, or (ii) reflecting the third polarized optical signal towards the polarization beam splitter and allowing the fourth polarized optical signal to pass through towards the polarization beam splitter.

11. The optical multiplexer of claim 10, wherein the first beam splitter is parallel with the first mirror, and the second mirror is orthogonal to the first beam splitter and the first mirror.

12. The optical multiplexer of claim 1, wherein the first beam splitter comprises a wavelength-selective filter or a dichroic mirror.

13. The optical multiplexer of claim 1, wherein the center wavelength of each of the first, second and third polarized optical signals differs from the other center wavelengths by about 0.4 nm to about 100 nm.

14. A transmitter optical subassembly, comprising:
- the optical multiplexer of claim 1;
- first, second and third lasers, configured to emit the first, second and third polarized optical signals, respectively; and
- a housing configured to surround and physically protect the first beam splitter, the polarization beam splitter, and the first, second and third lasers.

15. The transmitter optical subassembly of claim 14, further comprising first, second and third lenses, respectively collimating light emitted by the first, second and third lasers, and a fourth lens configured to focus an output signal from the optical multiplexer.

16. An optical transceiver, comprising:
- the transmitter optical subassembly of claim 14; and
- an optical receiver configured to receive and process a multi-channel optical signal.

17. The optical transceiver of claim 16, further comprising a number of photodiodes, each receiving an optical signal of the multi-channel optical signal and converting the optical signal to an electrical signal, and a number of amplifiers, each amplifying a respective electrical signal.

18. An optical transmitter, comprising:
- first, second, third and fourth lasers, respectively outputting first, second, third and fourth optical signals in parallel;
- one or more first mirrors, configured to reflect at least the first optical signal towards a first target, the reflected first optical signal crossing the second optical signal;
- a first beam splitter having the first target on a surface thereof, configured to combine the first and third optical signals by reflecting the first optical signal towards a second target and allowing the third optical signal to pass through towards the second target;
- a second beam splitter, configured to combine the second and fourth optical signals by reflecting the one of the second and fourth optical signals towards a third target and allowing the other of the second and fourth optical signals to pass through towards the third target;
- one or more second mirrors, configured to reflect the combined first and third optical signals towards a fourth target and the fourth optical signal towards the second beam splitter; and
- a third beam splitter, configured to combine the combined first and third optical signals with the combined second and fourth optical signals by either (i) reflecting the combined first and third optical signals towards a fifth target and allowing the combined second and fourth optical signals to pass through towards the fifth target, or (ii) reflecting the second and fourth optical signals towards the fifth target and allowing the combined first and third optical signals to pass through towards the fifth target,
- wherein each of the first, second, third and fourth optical signals has a unique center wavelength.

19. The optical transmitter of claim 18, wherein the one or more first mirrors also reflects one of the second and fourth optical signals, and the reflected second or fourth optical signal crosses the third optical signal.

20. The optical transmitter of claim 18, wherein the one or more first mirrors comprises separate mirrors configured to separately reflect the first and second optical. signals.

21. The optical multiplexer of claim 2, further comprising one or more mirrors configured to reflect the combined first and second optical signals towards the polarization beam splitter and the fourth polarized optical signal towards the second beam splitter.

22. The optical transmitter of claim 18, wherein the one or more second mirrors consists of a single mirror configured to reflect one of the combined first and third optical signals and the combined second and fourth optical signals towards the second beam splitter.

23. The optical transmitter of claim 18, further comprising first, second, third and fourth lenses, respectively collimating light emitted by the first, second, third and fourth lasers.

24. The optical transmitter of claim 23, further comprising a fifth lens configured to focus an output signal from the third beam splitter.

25. The optical transmitter of claim 18, wherein the third beam splitter comprises a polarization beam splitter.

26. A method of combining a plurality of polarized optical signals, comprising:
- combining first and second polarized optical signals by reflecting a first polarized optical signal towards a first target and allowing a second polarized optical signal to pass through towards the first target;
- rotating the combined first and second polarized optical signals by a first predetermined angle or amount using a first isolator;
- rotating the combined first and second polarized optical signals by a second predetermined angle or amount using a first wave plate;
- rotating a third polarized optical signal by a third predetermined angle or amount using a second isolator;
- rotating the third polarized optical signal by a fourth predetermined angle or amount using a second wave plate, the second wave plate having an opposite direction of polarization from the first wave plate; and
- combining the rotated and combined first and second polarized optical signals With the rotated third polarized optical signal by either (i) reflecting the rotated third polarized optical signal towards a second target and allowing the rotated and combined first and second polarized optical signals to pass through towards the second target, or (ii) reflecting the rotated and combined first and second polarized optical signals towards the second target and allowing the rotated third polarized optical signal to pass through towards the second target,
- wherein each of the first, second and third polarized optical signals has a unique center wavelength, and the first and second targets are the same or different.

27. The method of claim 26, wherein a first beam splitter combines the first and second polarized optical signals, and a polarization beam splitter combines the third polarized optical signal with the first and second polarized optical signals.

28. The method of claim 27, further comprising combining a fourth polarized optical signal with the third polarized optical signal using a second beam splitter by either (i) reflecting the third polarized optical signal towards the polarization. beam splitter and allowing the fourth polarized optical signal to pass through towards the polarization beam splitter, or (ii) reflecting the fourth polarized optical signal towards the polarization beam splitter and allowing the third polarized optical signal to pass through towards the polarization beam splitter.

29. The optical transmitter of claim 23, wherein the first and second optical signals have a first polarization type, and the third and fourth optical signals have a second polarization type.

30. The optical transmitter of claim 23, wherein the first, second, third and fourth optical signals have an identical polarization type.

31. The optical transmitter of claim 18, further comprising a first wave plate configured to rotate the combined first and third optical signals by a first predetermined angle prior to impinging on the third beam splitter.

32. The optical transmitter of claim 31, further comprising a first isolator in series with and preceding the first wave plate, the first isolator configured to rotate the combined first and third optical signals by a second predetermined angle.

33. The optical multiplexer of claim 32, further comprising a second isolator and a second wave plate in series with and following the second isolator, the second isolator configured to rotate the second and fourth optical signals by a third predetermined angle, the second wave plate being configured to rotate the second and fourth optical signals by a fourth predetermined angle prior to impinging on the third beam splitter, the fourth predetermined angle having a direction of polarization opposite from the first predetermined angle.

* * * * *